US011659397B2

(12) United States Patent
Andrews et al.

(10) Patent No.: US 11,659,397 B2
(45) Date of Patent: May 23, 2023

(54) SYSTEM AND METHOD OF ORCHESTRATING DISTRIBUTION OF NETWORK SLICES BASED ON ENDPOINT COMPUTING DEVICE SECURITY PROFILES

(71) Applicant: Dell Products, LP, Round Rock, TX (US)

(72) Inventors: Carlton A. Andrews, Austin, TX (US); Anantha K. Boyapalle, Cedar Park, TX (US); Joseph Kozlowski, Hutto, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 269 days.

(21) Appl. No.: 17/076,688

(22) Filed: Oct. 21, 2020

(65) Prior Publication Data
US 2022/0124486 A1 Apr. 21, 2022

(51) Int. Cl.
*H04M 1/66* (2006.01)
*H04M 1/68* (2006.01)
(Continued)

(52) U.S. Cl.
CPC .......... *H04W 12/37* (2021.01); *H04W 12/50* (2021.01); *H04W 12/71* (2021.01); *H04W 16/14* (2013.01); *H04W 84/04* (2013.01); *H04W 88/06* (2013.01)

(58) Field of Classification Search
CPC . H04W 12/0027; H04W 84/04; H04W 16/14; H04W 12/00512; H04W 88/06; H04W 12/003
(Continued)

(56) References Cited

U.S. PATENT DOCUMENTS 10,432,630 B2 * 10/2019 Takemoto ........... H04L 12/4675
10,581,601 B2 * 3/2020 Ramoutar ............. H04L 9/0869
(Continued)

FOREIGN PATENT DOCUMENTS

WO WO-2018174995 A1 * 9/2018 ............ H04W 48/04
WO WO-2018183436 A1 * 10/2018 ........... H04L 5/0044
WO WO-2021146029 A1 * 7/2021

*Primary Examiner* — Marceau Milord
(74) *Attorney, Agent, or Firm* — Prol Intellectual Property Law, PLLC; H. Kenneth Prol

(57) ABSTRACT

An information handling system of a Radio Access Network (RAN) system operating a secure network slice orchestration system may comprise a network interface device of the RAN system transceiving data within a 5G New Radio (NR) frequency band with an endpoint computing device, the network interface device receiving an instruction from a client solutions management (CSM) platform to assign a network slice within the 5G NR frequency band, based on a security profile associating the endpoint computing device with a security tier, to a network slice as established by a software defined network (SDN) controller within a sub-portion of the 5G NR frequency band, the secure network slice orchestration system determining the endpoint computing device is associated with the network slice within a communications profile received from the CSM platform, and the SDN controller establishing a virtual access point transceiving data within the network slice with the endpoint computing device.

20 Claims, 6 Drawing Sheets

(51) Int. Cl.
  *H04M 3/16*   (2006.01)
  *H04W 12/37*  (2021.01)
  *H04W 84/04*  (2009.01)
  *H04W 16/14*  (2009.01)
  *H04W 88/06*  (2009.01)
  *H04W 12/50*  (2021.01)
  *H04W 12/71*  (2021.01)

(58) Field of Classification Search
  USPC .......................................................... 455/410
  See application file for complete search history.

(56) References Cited

U.S. PATENT DOCUMENTS

| | | |
|---|---|---|
| 10,666,689 B2 * | 5/2020 | Hu .......................... H04L 63/126 |
| 10,694,352 B2 * | 6/2020 | Coyne ...................... H04W 4/60 |
| 11,240,855 B2 * | 2/2022 | Babbellapati ......... H04W 48/16 |
| 2016/0352924 A1 * | 12/2016 | Senarath ............... H04M 15/66 |
| 2018/0343567 A1 * | 11/2018 | Ashrafi ................... H04L 43/08 |
| 2020/0092794 A1 * | 3/2020 | Kang ....................... H04W 4/50 |
| 2020/0322262 A1 * | 10/2020 | Maino ..................... H04L 67/04 |
| 2021/0037010 A1 * | 2/2021 | Koshy .................. H04W 4/021 |
| 2021/0136569 A1 * | 5/2021 | Obaidi .................. H04W 12/37 |
| 2021/0219354 A1 * | 7/2021 | Babbellapati ......... H04W 76/11 |
| 2021/0235290 A1 * | 7/2021 | Boyapalle ........... H04L 41/5058 |
| 2021/0243676 A1 * | 8/2021 | Files ..................... H04W 28/08 |
| 2021/0344612 A1 * | 11/2021 | Files ...................... H04L 67/12 |
| 2021/0359912 A1 * | 11/2021 | Tervonen ............. H04W 48/16 |
| 2022/0104064 A1 * | 3/2022 | Kamat .............. H04W 28/0284 |
| 2022/0210658 A1 * | 6/2022 | Lee ....................... H04W 16/10 |
| 2022/0239568 A1 * | 7/2022 | Celozzi ............... H04L 41/5051 |

* cited by examiner

US 11,659,397 B2

SYSTEM AND METHOD OF ORCHESTRATING DISTRIBUTION OF NETWORK SLICES BASED ON ENDPOINT COMPUTING DEVICE SECURITY PROFILES

FIELD OF THE DISCLOSURE

The present disclosure generally relates to information handling systems and more specifically relates to information handling systems that facilitate wireless connectivity via Radio Access Network (RAN) systems to communicatively coupled endpoint computing devices.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
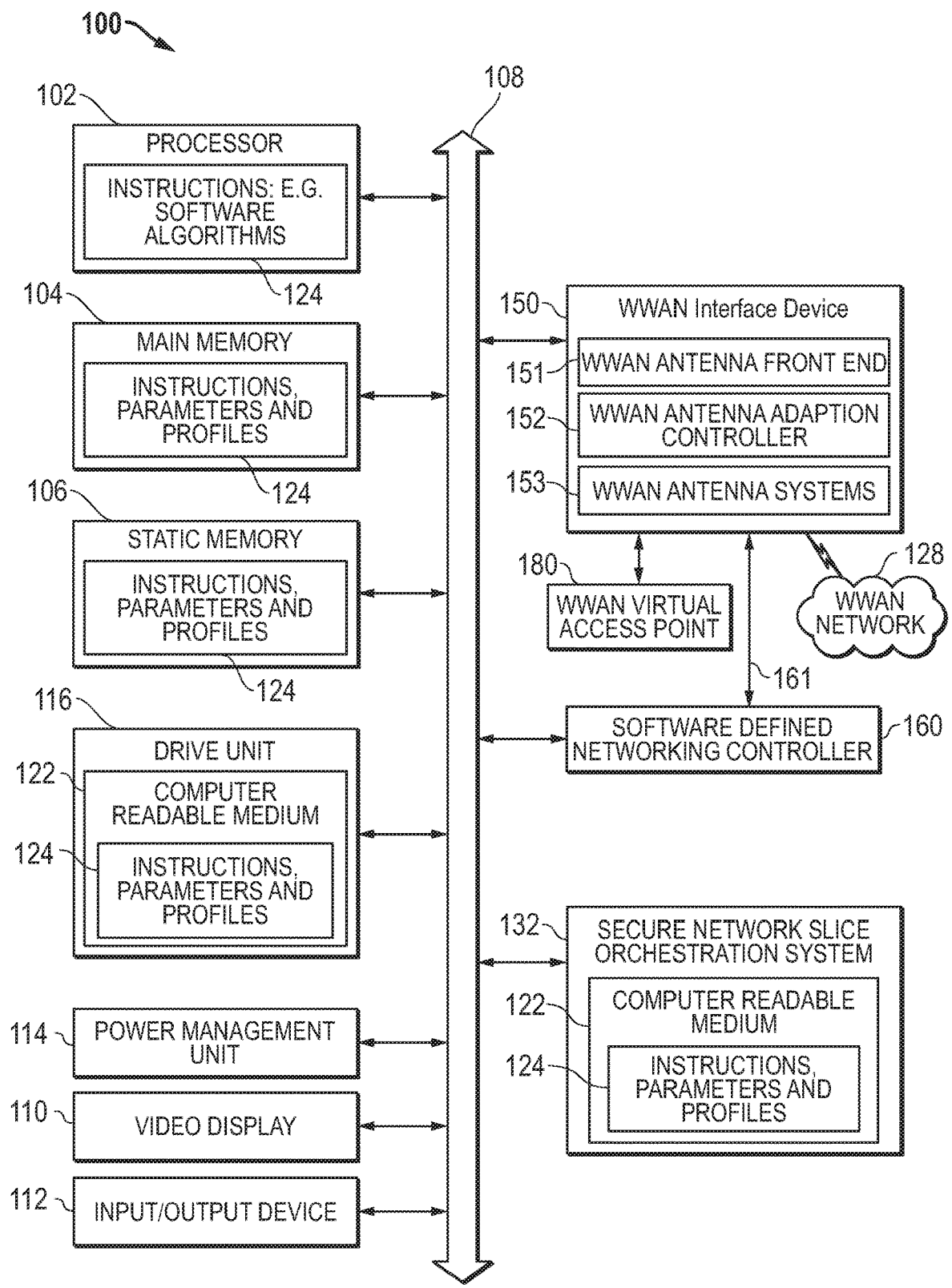
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems such as, for example, laptop/notebook computing devices, tablet computing devices, mobile phones, Internet of Things (IoT) computing devices, or other endpoint computing devices known in the art, often utilize wireless networks in order to enable mobility of those endpoint computing devices while exchanging data, as well as to exchange data from remote locations. Wireless networking technology has begun to transition from 4G millimeter wave (4G) wireless technology to 5G millimeter wave (5G) wireless technology. Current conventional 5G wireless technology includes a 5G core network system that is operated by a wireless provider (e.g., AT&T® Mobility of Atlanta, Ga., United States; SPRINT® Corporation of Overland Park, Kans., United States; VERIZON® Wireless of New York, N.Y., United States, etc.), and that operates with a 5G Radio Access Network (RAN) system that includes cellular tower systems that operate to exchange wireless communication for the endpoint computing devices discussed above. Such 5G communications typically provide greater range of communication frequencies, higher bandwidth, and lower latency over shorter distances.

One technique for exchanging wireless communications via the 5G core network system includes the use of network slicing according to embodiments herein, which enables multiplexing of virtualized and independent logical networks on the same physical network infrastructure. This 5G network slicing approach allows for leveraging the increased bandwidth available via the 5G communication system. Each network slice may provide a network (e.g., a portion of the wireless spectrum available from the 5G core network system) with particular networking characteristics to any of a plurality of endpoint computing devices, via the 5G RAN. Such network slicing technology may provide connectivity to a plurality of endpoint computing devices, each associated with varying levels of security. For example, network slices may be requested simultaneously by an endpoint computing device located in a physically secure campus and incapable of movement from that location, and by an employee on that campus operating her personal laptop or other mobile device that has few or no security requirements. Allowing the unsecure personal laptop and highly secured campus desktop to share a network slice may compromise the security of the campus desktop. A system is needed to ensure that the network slices allowing access to more secure endpoint computing devices do not also allow access by less secure endpoint computing devices.

Embodiments of the present disclosure address this issue by distributing network slice access based on security credentials for each requesting endpoint computing device. Such security credentials may be managed, for example, by client solutions management (CSM) platforms working in tandem with a secure network slice orchestration system. An administrator of a CSM platform may register an endpoint computing device with the CSM platform by device ID and may create a security profile for that device. Such a security profile may be stored at the CSM platform and may limit the number and identity of users for the endpoint computing device, or place limitations on the functionality of the endpoint computing device. This process may be repeated for several endpoint computing devices (e.g., all devices assigned to employees within a corporation).

The secure network slice orchestration system in an embodiment may operate in tandem with the CSM platform. The secure network slice orchestration system may be code executed by a controller or processor and may be located at a radio access network (RAN) system that is a 5G-enabled base station system for 5G protocol wireless communications. For example a RAN system may be a Next Generation Node B (gNodeB) of a 5G system, a femtocell, a carrier operated 5G base station, or at a private base station, or it may have an evolved Node B (eNodeB) of a 4G or LTE cellular system co-located with a 5G RAN system. For example, such a secure network slice orchestration system may be installed at one or more base stations, gNodeBs, or femtocells surrounding or accessible within a corporate campus. The secure network slice orchestration system in embodiments may operate on a controller, processor, or processing logic to negotiate accessibility to a plurality of 5G network slices via the 5G RAN system, and to transmit identification of these accessible network slices to the CSM platform. The CSM platform may be executable code operating at a remote information handling system in networked communication, either wired or wireless, with the 5G RAN system. An administrator of the CSM platform may then associate each of the available network slices with one or more security tiers, based on the number of network slices available at that secure network slice orchestration system, and upon the security profiles (and security requirements therewithin) associated with endpoint computing devices registered at the CSM platform. The CSM administrator may then create and transmit, to each endpoint computing device, a communications profile containing an address for the secure network slice orchestration system, a device ID for the endpoint computing device, and identification of one or more network slices the CSM platform has assigned to the endpoint computing device, based on the security profile for that endpoint computing device. The administrator may also transmit this communications profile to the secure network slice orchestration system, or otherwise grant the secure network slice orchestration system access to the communication profile, as stored at the CSM platform.

The endpoint computing device in embodiments may later request access, via the secure network slice orchestration system, to the network slice or slices identified within the communications profile received from the CSM platform. The secure network slice orchestration system in embodiments may access stored communications profiles to determine the requested network slice has been assigned to the requesting endpoint computing device. If the CSM platform has granted the requesting endpoint computing device access to the requested network slice(s), as determined based on the stored communications profile in embodiments, a Software Defined Network (SDN) controller of the secure network slice orchestration system may establish a virtual access point at the RAN system, for transceiving data with the endpoint computing device, within the requested network slice. In such a way, the SDN controller of the secure network slice orchestration system may communicatively couple the endpoint computing device and the RAN system such that the endpoint computing device may only communicate within the network slice assigned to that endpoint computing device by the CSM platform, based on a security profile for the endpoint computing device. The secure network slice orchestration system may thus ensure that the network slices allowing access to more secure endpoint computing devices do not also allow access by less secure endpoint computing devices.

FIG. 1 illustrates an information handling system 100 according to several aspects of the present disclosure. The information handling system 100 as illustrated in FIG. 1 may be communicatively coupled to a Wireless Wide Area Network (WWAN) network 128 and to one or more endpoint computing devices via one or more virtual access points 180. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable endpoint computing device capable of executing a set of instructions (sequential or otherwise) that specify actions to be taken by that endpoint computing device, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that endpoint computing device. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include a secure network slice orchestration system 132 that may be any device or devices that execute instructions, parameter, and profiles 124 so that voice and data communication requests from endpoint computing device(s) may be received and routed to a WWAN communication network 128, via one or more WWAN virtual access points 180, as described herein. The execution of the secure network slice orchestration system 132 may allow endpoint computing device(s) requesting access to secure network slices to be communicatively coupled, for example, to a private LTE communication network, a 4G LTE public communication network, or a 5G communication network including a 5G millimeter-wave (mm-wave) communication network, among other types of public and private communication networks, via one or more virtual access points 180, managed by the secure network slice orchestration system 132, and a software defined networking (SDN) controller 160.

The information handling system 100 may include a memory 104, (volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 102 illustrated in FIG. 1, hardware or software control logic, or any combination thereof. Additional components of the information handling system 100 may include one or more storage devices 106 or 116, a power management unit 114 supplying power to the software defined networking controller 160, the WWAN interface device 150, one or more communications ports for communicating with external devices, as well as, various input and output (I/O) devices 112, such as a keyboard, a mouse, or any combination thereof. The information handling system 100 may further include a video display 110. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems 100 according to various embodiments herein. In some embodiments, it is understood any or all portions of code instructions 124 may operate on a plurality of information handling systems 100.

The information handling system 100 may include a processor 102 such as a central processing unit (CPU), a GPU, or control logic or some combination of the same. Any of the processing resources may operate to execute code that is either firmware or software code. Moreover, the information handling system 100 may include memory such as main memory 104, static memory 106, containing computer readable medium 122 storing instructions 124. Instructions 124 may include a secure network slice orchestration system 132, operating system (OS) software, application software, BIOS software, or other software applications or drivers detectable by processor type 102. The disk drive unit 116 and static memory 106 may also contain space for data storage. The instructions 124 in an embodiment may reside completely, or at least partially, within the main memory 104, the static memory 106, and/or within the disk drive 116 during execution by the processor 102. The information handling system 100 may also include one or more buses 108 operable to transmit communications between the various hardware components such as any combination of various input and output (I/O) devices, display 110, WWAN interface device 150, or the like.

The WWAN interface device 150 may provide connectivity of the information handling system 100 to one or more endpoint computing devices via one or more WWAN virtual access points 180 in an embodiment. In another aspect of an embodiment, the WWAN interface device 150 may also provide connectivity of the information handling system 100 to one of a plurality of cellular, WWAN communication networks 128. The WWAN communication network 128 in some embodiments may be a wired wide area network (WAN), a private LTE communication network, a 4G LTE public communication network, or a 5G millimeter-wave (mm-wave) communication network, or other cellular communication networks. Connectivity to any of a plurality of WWAN networks 128 or to one or more endpoint computing devices in an embodiment may be via wired or wireless connection. In some aspects of the present disclosure, the WWAN interface device 150 may operate two or more wireless links. In other aspects of the present disclosure, the information handling system 100 may include a plurality of WWAN interface devices, each operating separate radio subsystems.

The WWAN interface device 150 may operate in accordance with any cellular wireless data communication standards. WWAN interface device 150, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the WWAN interface device 150 in an embodiment may transceive within radio frequencies associated with the 5G New Radio (NR) Frequency Range 1 (FR1) or Frequency Range 2 (FR2) or may further be sometimes considered 5G low-band, mid-band, or high-band frequency ranges under the 5G protocols and may fall into a variety of frequency bands supported for 5G wireless data communications. For example, NRFR1 may include radio frequencies below 6 GHz, associated with the 5G communications standards now emerging. NRFR2 may include radio frequencies above 6 GHz, made available within the now emerging 5G communications standard. Communications within NRFR1 may be enabled through the use a gNodeB, femtocell, or other 5G enabled base station executing the next generation packet core of the 5G cellular standard via one or more 5G antenna systems in some example embodiments.

Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands. WWAN, including 5G or 4G LTE communication standards for example may use the Unlicensed National Information Infrastructure (U-NII) band which typically operates in the ~5 GHz frequency band such as 802.11 a/h/j/n/ac (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the WWAN interface device 150 may be communicatively coupled to an array of WWAN antenna systems 153 used to provide a communication channel to or from an endpoint device. Information handling system 100 may be an endpoint device in some embodiments. In other embodiments, some or all of information handling system may represent a 5G wireless base station, such as a gNodeB base station, femtocell, carrier 5G base station, or other private 5G base station which may be use for communicative coupling an array of WWAN antenna systems 153, via a WWAN virtual access point 180, and to provide a separate communication channel to the WWAN network 128. Communication channels may be separated in such a way, for example, by allowing the endpoint computing device to communicate with the information handling system in a first network slice (e.g., sub-portion of the available WWAN radio frequencies), via a first WWAN virtual access point, and establishing communications between the endpoint information handling system 100 and the WWAN network 128 in a second network slice, via a second WWAN virtual access point in some embodiments as well. Such communications channels may be found in any communication network described herein. The WWAN antennas 153 may support a 5G wireless communication protocol so that relatively higher amounts of data may be transceived by the information handling system 100 to any WWAN communication network to which the information handling system 100 is communicatively coupled in some embodiments.

The WWAN antenna adaptation controller 152 may execute instructions as disclosed herein for monitoring wireless link state information, endpoint configuration data, network slice data, or other input data to generate channel estimation and determine antenna radiation patterns. For example, instructions or a controller may execute software or firmware applications or algorithms which utilize one or more wireless links for wireless communications via the WWAN wireless interface device 150 and the plurality of WWAN antenna systems 153 for the plurality of supported wireless protocols as well as other aspects or components.

The WWAN interface device 150 in an embodiment may further include a WWAN antenna front end system 151 which may operate to modulate and demodulate signals transceived within a WWAN format, set signal transmission power levels or sensitivity to signal reception, select channels or frequency bands, and conduct other functions in support of a wireless transmission from the WWAN virtual access point 180 to the WWAN communication network 128. In one aspect of an embodiment, the WWAN antenna front end 151 may receive communication frames from the software defined networking (SDN) controller 160 and instructions to forward those frames to the WWAN network 128 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz). In another aspect of an embodiment, the WWAN antenna front end 151 may receive communication frames from the WWAN network 128 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz) and forward the received frames to the SDN controller 160, along with an identification of the radio frequency at which the frames were received.

The WWAN interface device 150 may be communicatively coupled to the SDN controller 160 via bus 108 or via a separate communication line 161. The communication line 161 and bus 108 in an embodiment may support one or more protocols for routing packets/frames between or among network interface devices via an SDN controller 160, such as, for example, the OpenFlow® protocol, or the Interface to the Routing System (i2rs) protocol. It is contemplated that communication line 161 or bus 108 may support any other currently known or later developed protocols for control of a network interface device by an SDN controller 160. The SDN controller 160 in an embodiment may include, for example, an OpenDaylight® controller, a Nicira® Networks/VMWare NOX™ controller, a NTT®/Google ONIX® controller, the NEC® Trema® controller, the NTT® Ryu® controller, or open-sourced controllers such as POX or Beacon controllers. In some embodiments, the SDN controller 160 may comprise a software-defined wide-area network (SD-WAN) controller operating to unify networking connections covering a wide geographical area within an enterprise.

The SDN controller 160 in an embodiment may operate, in part, to route data incoming from or outgoing to endpoint computing devices assigned by a Client Solutions Management (CSM) system to a specific security tier associated with a specific radio frequency sub-portion (e.g., network slice), such that the data is only transceived within that specific radio frequency sub-portion (e.g., network slice). This may be referred to herein as establishing a virtual access point (e.g., WWAN virtual access point 180) for communication with only endpoint computing devices belonging to the same security tier.

The SDN controller 160 in an embodiment may operate in a control plane layer (e.g., via software), in part, to route incoming packets/frames to a network interface device for transmission in a specific network slice. For example, the SDN controller 160 may operate to retrieve data frames received at a WWAN interface device, within a first preset or identified radio frequency sub-portion (e.g., network slice), and route the received frames back to the WWAN interface device, for transmission only within a second preset or identified radio frequency sub-portion, where both the first and second sub-portions or network slices are associated with endpoint computing devices within the same CSM-assigned security tier. In such a way, the SDN controller 160 may cause data frames received via a WWAN interface device 150 within a specific network slice or specifically identified radio frequency sub-portion assigned by the CSM platform to endpoint computing device within a single security tier, based on a security profile for those endpoint computing devices, to be transmitted by the WWAN interface device 150 only within that specifically identified network slice.

Each of the WWAN virtual access points 180 in an embodiment may enable communication in a separate network slice via a single radio of the WWAN interface device 150. For example, a first WWAN virtual access point in an embodiment may transceive in the radio frequency spectrum sub-portion below 1 GHz (e.g., 5G low-band or LTE), and a second WWAN virtual access point may transceive in the radio frequency sub-portion above 6 GHz (e.g., 5G high-band or mm-wave). These are only two examples of available but separate radio frequency spectrum sub-portions or network slices, and, as described above, the WWAN interface device 150 may be capable of transceiving via the WWAN virtual access point(s) 180 in accordance with any cellular wireless data communication standards.

The WWAN interface device 150 in an embodiment, acting as an access point between a plurality of endpoint computing devices and the WWAN network 128, such as a base station system with processing capability, may be capable of transceiving in a broad radio frequency spectrum. This software defined routing of data frames for receipt and transmission only within the specified network slice effectively narrows the radio frequency spectrum for which the WWAN interface device 150 may act as an access point for any one of the plurality of endpoint computing devices, or a group of endpoint computing devices belonging to the same security tier, to a sub-portion of the available spectrum, or a specific network slice. The SDN controller 160 in such an embodiment may repeat this narrowing process for each of several groups of endpoint computing devices, based on their assigned security tiers, such that the WWAN interface device 150 may only act as an access point for transceiving data with a plurality of endpoint computing devices within a specific network slice assigned to each of those endpoint computing devices via the secure network slice orchestration system 132 or the CSM platform. Because this narrowing is achieved through network virtualization (e.g., software defined in the control plane via the SDN controller 160), this process of narrowing the range of radio frequency spectrum to a specific network slice assigned to one or more authorized endpoint computing devices may be referred to herein as establishing a WWAN virtual access point 180. Such a WWAN virtual access point 180 may represent a software defined distinction between various network slices, rather than any specific hardware separate and apart from the WWAN interface device 150. In other words, the WWAN virtual access point 180 may comprise a portion of the WWAN interface device 150, or any combination of sub-parts thereof (e.g., WWAN antenna front end 151, WWAN antenna adaptation controller 152, or WWAN antenna system 153).

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a WWAN network 128 may communicate voice, video or data over the network 128. Further, the instructions 124 may be transmitted or received over the WWAN network 128 via the WWAN interface device 150. The information handling system 100 may include a set of instructions 124 that may be executed to cause the computer system to perform any one or more of the methods or computer-based functions disclosed herein. For example, instructions 124 may execute a secure network slice orchestration system 132, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Application instructions 124 may also include any application processing drivers, or the like executing on information handling system 100 as an endpoint device or secure network slice orchestration system.

The secure network slice orchestration system 132 may utilize a computer-readable medium 122 in which one or more sets of instructions 124 such as software may be embedded. The instructions 124 may embody one or more of the methods or logic as described herein. For example, instructions relating to the secure network slice orchestration system 132, software algorithms, processes, and/or methods may be stored here. As explained, some or all of the secure network slice orchestration system 132 may be executed locally or remotely.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions, parameters, and profiles 124 of the secure network slice orchestration system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the secure network slice orchestration system 132 that may be operably connected to the bus 108. The secure network slice orchestration system 132 may, according to the present description, perform tasks related to apportioning a plurality of network slices among a plurality of communicatively coupled endpoint computing devices to partition available 5G network bandwidth. In an embodiment, the secure network slice orchestration system 132 may communicate with the main memory 104, the processor 102, the power management unit 114, the video display 110, the input device 112, the SDN controller 160, and the WWAN interface device 150, via bus 108, and several forms of communication may be used, including ACPI, SMBus, a 24 MHZ BFSK-coded transmission channel, or shared memory. Driver software, firmware, controllers and the like may communicate with applications on the information handling system 100, and various hardware systems.

During operation, the secure network slice orchestration system 132 of the information handling system 100 may work in tandem with the SDN controller 160 to establish a number of virtual access points (e.g., WWAN virtual access point 180). These virtual access points may each be selectively communicatively coupled to an endpoint computing device. The endpoint computing device may be any type of computing device that may be communicatively coupled to a communication network (e.g., WWAN network 128) via execution of the secure network slice orchestration system 132 as described herein. The endpoint devices may be any one of a mobile cell phone, a laptop computing device, a desktop computing device, a tablet device, and a personal digital assistant device, among other types of endpoint devices that are attempting to establish communication with a communication network such as a 5G private communication network, a 5G public communication network, or a 5G millimeter-wave (mm-wave) communication network, among other types of public and private communication networks.

In an embodiment, the endpoint device is communicatively coupled to the information handling system 100 via a virtual access point (e.g., WWAN virtual access point 180), as described in greater detail above. The virtual access point (e.g., WWAN virtual access point 180) may be communicatively coupled to the endpoint computing device using any communication protocol including, but not limited to, 5G NR communication protocols, and citizens broadband radio service (CBRS) communication utilization protocols (such as a private LTE system). During operation, the endpoint computing device in an embodiment may communicate to the secure network slice orchestration system 132 a request for access to a network slice identified within a communications profile received at the endpoint computing device from the CSM platform. In such an embodiment, the CSM platform may create such a communications profile by determining the endpoint computing device security requirements match security requirements for other endpoint computing devices transceiving data within a specifically identified network slice, then generating instructions for the endpoint computing device to request access to that specifically identified network slice. The secure network slice orchestration system 132 in such an embodiment may respond to the request for access to the specifically identified network slice by granting the endpoint computing device access to that network slice only if communications profiles to which the secure network slice orchestration system 132 has access associate the requesting endpoint computing device with the requested network slice. Thus, the CSM platform in an embodiment may operate in tandem with the secure network slice orchestration system 132 to grant network slice access to a plurality of endpoint computing devices, based on security profiles for each of the endpoint computing devices, such that only endpoint computing devices sharing similar security profiles may access the same network slice. The information handling system 100, or portions thereof, may operate as a control system at a 5G-enabled base station, such as a gNodeB, femtocell, carrier or private 5G base station of a cellular network in some embodiments. In other embodiments, the information handling system 100, or portions thereof, may operate as a remote administration system with the CSM platform, or as one or more endpoint computing devices.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
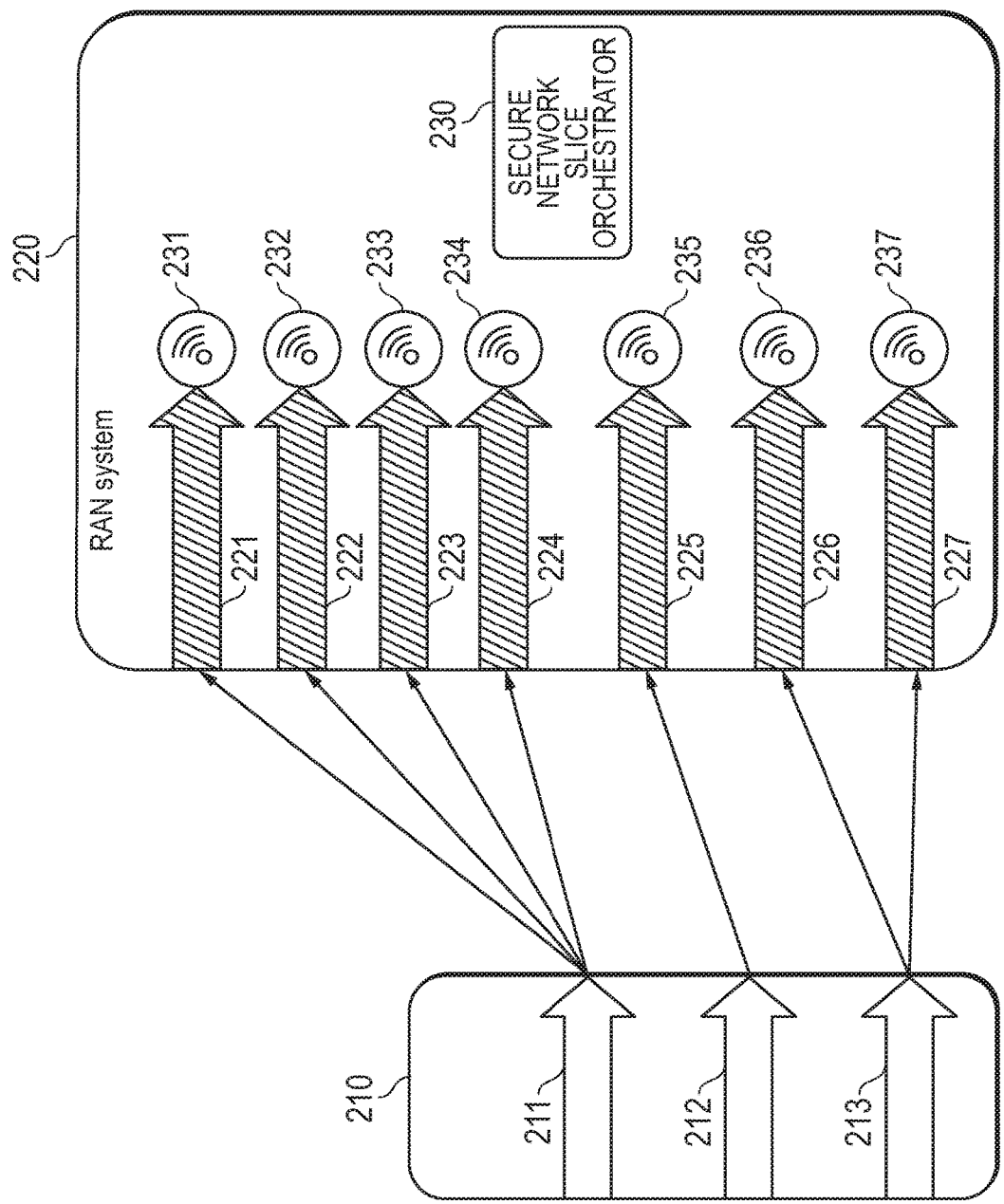
FIG. 2 is a block diagram illustrating a secure network slice orchestration system and RAN system establishing a plurality of network slices according to an embodiment of the present disclosure.

FIG. 2 is a block diagram illustrating a secure network slice orchestration system and Radio Access Network (RAN) system establishing a plurality of network slices for distribution to endpoint computing devices according to an embodiment of the present disclosure. As described herein, the network interface device of the secure network slice orchestrator 230 in an embodiment may receive one or more network slices, each comprising a separate slice of the spectrum of radio communications available via a wireless signal service provider (e.g., AT&T® Mobility of Atlanta, Ga., United States; SPRINT® Corporation of Overland Park, Kans., United States; VERIZON® Wireless of New York, N.Y., United States; etc.). Such service providers may provide a 5G core network system 210 that includes any combination of physical or virtual components that are configured to provide 5G wireless communications, for example, via backhaul connectivity at a cell tower operated by the service provider. The core network system 210 in an embodiment may include server devices, switch devices, storage devices, or other core network system components required to operate a 5G core network system. However, while illustrated and discussed as physical or virtual components that provide 5G wireless communications, one of skill in the art in possession of the present disclosure will recognize that other components or component configuration may be utilized in a core network system to provide other wireless communications capabilities (e.g., 4G wireless communications) while remaining within the scope of the present disclosure as well.

The core network system 210 in an embodiment may have access to, or be capable of, transmitting and receiving wireless signals within a plurality of portions of the radio frequency spectrum. For example, the core network system 210 may have access to a first spectrum portion 211, a second spectrum portion 212, and a third spectrum portion 213. These spectrum portions 211, 212, and 213 may be separate from one another, and may not overlap in an embodiment. For example, spectrum portion 211 in an embodiment may include the 5G mm-wave communication network spectrum (e.g., above 6 GHz, or between 24 GHz and 52 GHz). This spectrum portion may provide peak data rates in comparison to other portions of the spectrum with extremely low latency, but limited coverage (e.g., distance from the base station). As another example, spectrum portion 212 in an embodiment may include the mid-band (e.g., below 6 GHz and above 1 GHz), which may provide higher bandwidth (up to 1 Gbps) than the low-band spectrum, and lower latency. In still another example, spectrum portion 213 in an embodiment may include the low-band (e.g., below 1 GHz) currently available in LTE technology. The low-band spectrum portion (e.g., 213) may provide lower bandwidth, but greater coverage than either the mid-band or mm-wave spectrum portions (e.g., 211, or 212, respectively).

In an embodiment, the core network system 210 may make each of these available radio frequency spectrum portions available to a RAN system 220 via wired or wireless connection between the 5G cell tower and the RAN system 220. The RAN system 220, working in tandem with the secure network slice orchestrator 230 in an embodiment may enable the multiplexing of virtualized and independent logical networks. In some embodiments, the secure network slice orchestrator 230, or a portion thereof, may be a controller co-located with the RAN system 220. The RAN system may be, for example, a 5G enabled base station with processing capability such as a gNodeB, femtocell, or other carrier or private 5G base station of a cellular network in an embodiment. The 5G enabled base station may include a software defined networking (SDN) controller or other processing to execute instructions of the secure network slice orchestrator 230 as well as to generate secure network slices. This form of virtual network architecture combines principles behind software defined networking (SDN) and network functions virtualization (NFV) on a fixed network to increase flexibility. Network slicing may separate a control plane (CP) from the user plane to move the functionality of the user plane towards an edge of the network. Each network slice formed and managed by the RAN system 220 and secure network slice orchestrator 230, such as via the SDN controller, in an embodiment may have its own architecture, provisioning management and security that supports a particular purpose associated with the purpose of the formation of the network slice. Considerations such as speed, capacity, connectivity, security, and coverage are allocated to meet the requirements of the network slice's objectives. In examples where the connection has low latency and adequate bandwidth, the prioritization of different tasks may be performed on a software level division of the network. The network slices that occupy a single physical network may be separated such that traffic and/or security breaches from one network slice does not interfere with another network slice formed and managed by the RAN system 220 with a secure network slice orchestrator 230. In an embodiment, each network slice formed and managed by the RAN system 220 with the secure network slice orchestrator 230 may be isolated within the network and may be tailored to fulfill diverse network requirements.

The RAN system 220, having a WWAN network interface device and 5G enabled antenna systems working in tandem with the secure network slice orchestrator 230 in an embodiment may separate traffic into a plurality of network slices, based, at least in part, upon the number of security tiers to which endpoint computing devices in communication with the RAN system 220 may belong. The secure network slice orchestrator 230 in an embodiment may receive identification of the number of security tiers from a CSM platform, as described in greater detail with respect to FIG. 3. By establishing at least one network slice for each identified security tier in an embodiment, the secure network slice orchestrator 230 may avoid cross-access or security breaches between an endpoint computing device in a first security tier, transceiving in a first network slice, and a second endpoint computing device in a second (e.g., potentially less secure) security tier, transceiving in a second network slice.

In other aspects, the secure network slice orchestrator 230 may define the number of network slices into which available radio frequency spectra may be separated based, at least in part, upon QoS metrics. For example, as described above, each of the radio frequency spectrum sub-portions 211, 212, and 213 may provide different QoS metrics (e.g., higher bandwidth at 211, greater coverage at 213). In order to provide the benefits of a given radio frequency spectrum sub-portion (e.g., higher bandwidth of 211) to endpoint computing devices in a plurality of security tiers, while still maintaining a separate network slice for each security tier, the secure network slice orchestrator may establish a separate network slice for each security tier, within a single radio frequency spectrum portion received from the core network 210. For example, in an embodiment in which there are four security tiers, the secure network slice orchestrator 230 may establish four separate network slices, each transceiving within the 5G mm-Wave NRFR2 radio frequency portion 211. Thus, the secure network slice orchestrator 230 may establish any number of network slices via operation of SDN code instructions, based on these considerations. The network slices illustrated within FIG. 2 are only an example of such a distribution of network slices by the secure network slice orchestrator 230 and is meant to be illustrative, rather than limiting.

The RAN system 220 and secure network slice orchestrator 230, for example, may establish a plurality of network slices from the radio spectrum portion 211 received from the core network system 210, such that each of network slices 221, 222, 223, and 224 operate within the 5G mm-Wave NRFR2 spectrum portion to provide peak data rates and extremely low latency within a limited coverage area. This may be achieved, for example, by allocating a portion of the 5G mm-Wave NRFR2 spectrum (e.g., between 24 GHz and 52 GHz) to each of the network slices (e.g., 221, 222, 223, and 224). For example, in an embodiment, the network slice 221 may facilitate communication between 24 GHz and 31 GHz, network slice 222 may facilitate communication between 31 GHz and 38 GHz, network slice 223 may facilitate communication between 38 GHz and 45 GHz, and network slice 224 may facilitate communication between 38 GHz and 45 GHz. Each of these network slices may allow for communications between the RAN system 220 and a plurality of endpoint computing devices within the same 5G band (e.g., 5G mm-wave offering the highest bandwidth and lowest latency), but such communications may be isolated from one another due to their non-overlapping frequency ranges (e.g., 24-31 GHz, 31-38 GHz, 38-45 GHz, and 45-52 GHz). This is only one example of establishing several network slices (e.g., 221, 222, 223, or 224) within the same 5G frequency spectrum portion (e.g., 211). In other embodiments, the frequency spectrum portion 212 or 213 may be separated into a plurality of network slices in a similar fashion, by assigning non-overlapping frequency ranges to each network slice. Further, the number of network slices established within each frequency range portion (e.g., 211, 212, or 213) in an embodiment may depend, at least in part, upon the number of security tiers in which endpoint computing devices in communication with the RAN system 220 may be assigned.

As another example, the RAN system 220 and secure network slice orchestrator 230 may establish a network slice 223 from the radio spectrum portion 212 received from the core network system 210, such that network slice 225 operates within the 5G NRFR1 mid-band spectrum portion to provide higher bandwidth and lower latency than the low-band spectrum portion. In still another example, the received from the core network system 210 in an embodiment may establish a network slices 226 and 227 from the single radio frequency spectrum portion 213. In such an embodiment, the network slices 226 and 227 may operate within the 5G NRFR1 low-band frequency spectrum portion to provide the greatest coverage available, though at lower bandwidth and higher latency than other available spectrum portions. In some embodiments, network slices 226 and 227 may provide similar or identical wireless signal metrics. In other embodiments, network slices 226 and 227 may provide different functionalities or wireless signal metrics. For example, network slice 226 in an embodiment may comprise a private 5G NRFR1 low-band network, while network slice 227 may comprise a public 5G NRFR1 low-band network. One of skill in the art in possession of the present disclosure will appreciate that each network slice (e.g., 221, 222, 223, 224, 225, 226, or 227) may provide particular networking characteristics or networking performance metrics, including particular data transmission latency, particular data transmission throughput/bandwidth, particular data transmission reliability, other particular Quality of Service (QoS) characteristics, and/or other particular networking performance metrics that would be apparent to one of skill in the art in possession of the present disclosure.

In an embodiment, the secure network slice orchestrator 230 may configure the RAN system 220 to provide wireless communications for a plurality of endpoint computing devices of varying security tiers, utilizing network slices established by the secure network slice orchestrator 230 working in tandem with the RAN system 220. For example, the RAN system 220 and secure network slice orchestrator 230 may provide an orchestration layer for wireless communications between the RAN system 220 and the plurality of endpoint computing devices, via a Software Defined Networking (SDN) switch device of the RAN system 220 and a separate control-based interface provided by the secure network slice orchestrator 230. The separation of the SDN switch device and the control-based interface in embodiments may allow flexibility of the RAN system 220 in accommodating Network Function Virtualization (NFV) techniques utilized in 5G communications. Specific examples or components or structures comprising the RAN system 220 in an embodiment may include controllers and instructions to execute SDN switching, and NFV within plural network elements such as radio/cellular towers, base stations, antennas, core network interface devices, or any other RAN subsystems that would be apparent to one of skill in the art. In an example embodiment, the RAN system 220 may be a 5G RAN system including small-cellular towers, gNodeB, or eNodeB base stations.

The secure network slice orchestrator 230 in an embodiment may manage the distribution of one or more network slices established at the RAN system 220 among a plurality of endpoint computing devices in communication with the secure network slice orchestrator 230 and RAN system 220. The secure network slice orchestrator 230 in an embodiment may establish a plurality of WWAN virtual access points (e.g., 231, 232, 233, or 234), each transceiving data within a single network slice operating in the 5G mm-Wave NRFR2 high-range spectrum portion. The SDN code instructions operating with the secure network slice orchestrator 230 may partition a WWAN interface device into one or more WWAN virtual access point for access to partitioned 5G network slices from the 5G network core 210 in an embodiment. For example, the secure network slice orchestrator 230 in an embodiment may establish WWAN virtual access point 231 for transceiving data with one or more endpoint computing devices within network slice 221 established by the RAN system 220, working in tandem with the secure network slice orchestrator 230, as described above. As another example, the secure network slice orchestrator 230 in an embodiment may establish WWAN virtual access point 232 for transceiving data with one or more endpoint computing devices within network slice 222. In another example, the secure network slice orchestrator 230 in an embodiment may establish WWAN virtual access point 233, via a RAN system 200, for transceiving data with one or more endpoint computing devices within network slice 223. In still another example, the secure network slice orchestrator 230 in an embodiment may establish WWAN virtual access point 234, via a RAN system 200, for transceiving data with one or more endpoint computing devices within network slice 224.

The secure network slice orchestrator 230 in an embodiment may also establish, via a RAN system 200, a plurality of WWAN virtual access points (e.g., 235, 236, or 237), each transceiving data within a single network slice operating in the 5G NRFR1 spectrum portions. For example, the secure network slice orchestrator 230 in an embodiment may establish WWAN virtual access point 235 for transceiving data with one or more endpoint computing devices within the 5G NRFR1 mid-band network slice 225 established by the RAN system 220, working in tandem with the secure network slice orchestrator 230, as described above. As another example, the secure network slice orchestrator 230 in an embodiment may establish WWAN virtual access points 236 and 237 for transceiving data with one or more endpoint computing devices within the 5G NRFR1 low-band network slices 226 and 227, respectively. In some embodiments, WWAN virtual access point 236 may transceive only within a private 5G NRFR1 low-band network slice 226, while WWAN virtual access point 237 transceives within a public 5G NRFR1 low-band network slice 227.

The WWAN virtual access points (e.g., 231, 232, 233, 234, 235, 236, or 237) in an embodiment may correlate to the WWAN virtual access point 180 described with reference to FIG. 1, and at least portions of the information handling system 100 described therein may be incorporated within or comprise the RAN system 220. RAN system 220 may be a 5G enabled base station such as a femto or small cell system, gNodeB, or similar carrier or private 5G base station system having the secure network slice orchestrator 230. For example, the RAN system 220 may include an SDN controller operating in a control plane layer (e.g., via software), in part, to route incoming packets/frames to a network interface device for transmission in a specific network slice, established based on instructions of the secure network slice orchestration system operating at the secure network slice orchestrator 230. This software defined routing of data frames for receipt and transmission only within the specified network slice effectively narrows the radio frequency spectrum for which the WWAN interface device of the secure network slice orchestrator 230 may act as an access point for any one of a plurality of endpoint computing devices within a single security tier, to a sub-portion of the available spectrum, or a specific network slice. Because this narrowing is achieved through network virtualization (e.g., software defined in the control plane via the SDN controller of the RAN system 220), this process of narrowing the range of radio frequency spectrum to a specific network slice assigned to an endpoint computing device may be referred to herein as establishing a WWAN virtual access point (e.g., 231, 232, 233, 234, 235, 236, or 237). Such virtual separation of network slices in an embodiment may effectively allow only assigned devices (e.g., endpoint computing devices within a specific security tier) to communicate with the RAN system 220 within discrete and separate sub-portions of the available cellular radio frequency spectrum. Because communication in one frequency sub-portion via SDN formed slice partitions cannot interfere with communication in a second frequency sub-portion, assignment of separate network slices to each of a plurality of endpoint computing devices within separate security tiers may prevent cross-access between endpoint computing devices in different security tiers, providing secure communications.

Each network slice allocated in such a way may have its own architecture, provisioning management and security that supports a particular purpose or device. Such a particular purpose in embodiments described herein may include provisioning of secure communications, or execution of one or more applications at each of the extended endpoint computing devices, operating as an endpoint computing device. By allocating available network slices to these various extended endpoint computing devices in an embodiment, the secure network slice orchestration system of the secure network slice orchestrator 230, working in tandem with the RAN system 220, may provide each endpoint computing device with a separate wireless signal meeting the specific performance and security requirements for that endpoint computing device, while avoiding cross-traffic, interference, or security breaches between or among the various network slices. In such a way, the secure network slice orchestrator 230 working in tandem with the RAN system 220 may apportion network slices such that only endpoint computing devices with similar security profiles or identified as belonging to the same security tier may share the same network slice.

Figure 3:
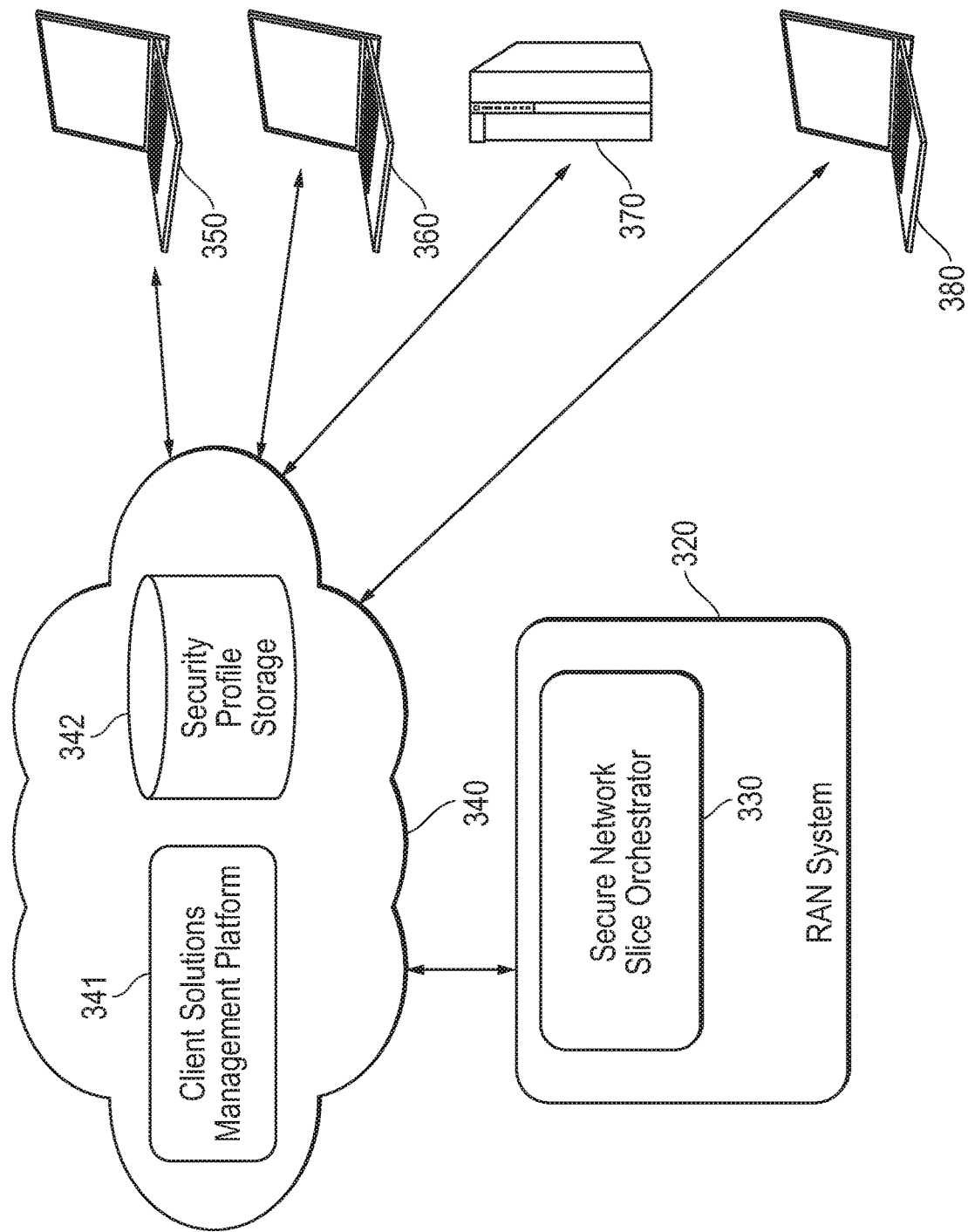
FIG. 3 is a block diagram illustrating a client solutions management (CSM) platform associating endpoint computing devices with network slices according to an embodiment of the present disclosure.

FIG. 3 is a block diagram illustrating a client solutions management (CSM) platform associating endpoint computing devices with network slices based on security profiles of the endpoint computing devices according to an embodiment of the present disclosure. As described herein, the secure network slice orchestrator 330 may work in tandem with a client solutions management platform 341 in an embodiment to apportion network slices such that only endpoint computing devices (e.g., 350, 360, 370, or 380) with similar security profiles or identified as belonging to the same security tier may share the same network slice. Each of the endpoint computing devices (e.g., 350, 360, 370 or 380) in an embodiment may be registered with the CSM platform 341 prior to use of the endpoint computing devices by end user (e.g., employees of a company managing each of the endpoint computing devices. Such registration may include transmitting an identification of each of the endpoint computing devices 350, 360, 370, and 380 (e.g., by device ID) to the CSM platform 341 for storage at the security profile storage 342, and may be performed, for example, by an IT professional employed by the company.

In an embodiment, a device ID may include, for example, a Media Access Control (MAC) address, a system ID (SID), or any other identifier capable of uniquely identifying an individual endpoint computing device, such as a laptop or other computer. SIDs may be created in some embodiments may be created on an endpoint computing device using an algorithm that accesses hardware information (e.g., serial numbers) to create the SID. Both MAC addresses and SIDs may be hacked, spoofed, altered, or otherwise tampered with in some scenarios. Thus, the device ID in some embodiments of the present disclosure may include a Dell® Device ID (DDID), which is a serial number assigned to a Dell® endpoint computing device, at the time of manufacture, and maintained in a secure Dell® facility throughout the lifecycle of the endpoint computing device. Such a DDID may not be spoofed, hacked, or otherwise tampered with an embodiment without physically accessing such secure Dell® facilities, and thus, provide a greater degree of certainty in identifying endpoint computing devices.

The secure network slice orchestration system in an embodiment may communicate with the CSM platform 341, which may be located in a cloud-based network or environment 340. For example, the CSM platform 341 may be a Dell Unified Workspace® platform, a Workspace One® platform, a Microsoft Intune® platform, or a VMware Airwatch®. The CSM platform 341 determines and monitors adherence to security measures in place at each of the plurality of endpoint computing devices managed by the CSM platform 341. The CSM platform 341 in an embodiment may operate to manage security credentials, distribution of proprietary applications, performance metrics, or communication capabilities across several computing devices of a company. For example, a CSM platform 341 may track which endpoint computing devices are issued to which employees, or which employees may access a given endpoint computing device. As another example, a CSM platform 341 may track limitations that have been placed on one or more endpoint computing devices in order to ensure secure operations of that endpoint computing device and security of data stored thereon. Examples of such limitations may include password or other authentication of users, limiting a user's ability to download data or applications to the endpoint computing device, or encryption of data stored on the endpoint computing device. Other examples of such limitations may include limitations on mobility of the endpoint computing device. For example, an endpoint computing device may be identified as a stationary desktop device located within a physically secure facility. Each endpoint computing device registered at the CSM platform 341 in an embodiment may be associated with a security profile, created by an administrator for the CSM platform 341, that described the security provided at each endpoint computing device.

Endpoint computing devices (e.g., 350, 360, 370, or 380) in an embodiment may be grouped into security groups or tiers, based on the security provided at each endpoint computing device. For example, an administrator in an embodiment may identify a security tier or security group as comprising only endpoint computing devices that are stationary and located within a physically secure facility. Such a security tier in an embodiment may be referred to herein as a physically secured security tier. As another example, an administrator in an embodiment may identify a second security tier as comprising endpoint computing devices that are mobile, but restrict access of the user to certain uses, or restrict the user's ability to download and install certain or all applications. Such a security group or tier in an embodiment may be identified as limited access/restricted personal computers (PCs). As yet another example, an administrator in an embodiment may identify a third security tier as comprising endpoint computing devices having few or no known security measures in place. This security tier or group may be referred to herein as promiscuous and potentially unmanaged PCs, and may include computing devices not registered at the CSM platform 341, or not associated with a security profile at the CSM platform 341. Such devices may include personal endpoint computing devices of employees or mobile devices of visitors to a corporate campus.

In other aspects, the administrator of a CSM platform 341 may define a security tier based on operations being executed at an endpoint computing device. For example, some endpoint computing devices may routinely communicate with a mobile device management (MDM) platform used by an IT department to monitor, manage, and secure employees' mobile devices that are deployed across multiple mobile service providers and across multiple mobile operating systems being used in an organization. In furtherance of this service, the MDM platform in an embodiment may routinely gather performance and security metrics from registered devices, provide and install updates to authorized applications, or update security credentials (e.g., granting greater or less access to certain applications). Many of these communications in an embodiment may be performed within an out-of-band channel allowing the MDM to access the endpoint computing device below the user level (e.g., in kernel mode).

Because these communications allow for access below the user level and may include transmission of sensitive personal information (e.g., within a snapshot of current performance or security metrics at the endpoint computing device), these communications may be associated with a higher security tier than other routine operations performed at the endpoint computing device (e.g., transfer of documents, checking e-mail, browsing the internet). Thus, an administrator of the CSM platform 341 in an embodiment may associate such out-of-band communications with a highest available security tier.

Each endpoint computing device in an embodiment may be associated with one of the administrator-defined security tiers within a security profile associated with the endpoint computing device and stored at the security profile storage 342, also located in the cloud-based network or environment 340. An administrator of the CSM platform 341 in an embodiment may create or edit a security profile stored at the security profile storage 342 for each of the endpoint computing devices 350, 360, 370, and 380.

These security profiles may be stored at the CSM platform 341 in an embodiment prior to any of the endpoint computing devices (e.g., 350, 360, 370, or 380) requesting access to a network slice. For example, the endpoint computing device 350 in an example embodiment may be associated within a security profile identifying the endpoint computing device 350 (e.g., by its MAC address, SID, or DDID) with the limited access/restricted PC security tier. For example, the CSM platform administrator in such an embodiment may require password or other authentication identifying a user as an authorized administrator or as the employee to which the endpoint computing device 350 is assigned. In some embodiments, the CSM platform administrator may require multiple forms of authentication, including, for example, password authentication, and one or more forms of biometric or voice authentication. All forms of authentication known in the art are also contemplated herein, including authentication via a key fob or other peripheral device. In another example, the administrator in such an embodiment may limit the employee's ability to download, install, or execute certain applications (e.g., personal e-mail applications, games, other applications identified as potentially unsecure). In still another example, the administrator in such an embodiment may identify the endpoint computing device 350 as mobile, or may identify one or more geographic locations (e.g., on the campus of the employee's business) which provide a heightened security environment.

The endpoint computing device 360 in an embodiment may be a mobile computing device (e.g., laptop, tablet, notebook, smart phone, etc.) that the CSM platform administrator has assigned fewer security restrictions than the endpoint computing device 350. In another embodiment, the endpoint computing device 360 may be a personal mobile device that has not been registered with the CSM platform 341, or is not associated with a stored security profile. In both such embodiments, the endpoint computing device 360 may be associated within a security profile identifying the endpoint computing device 360 (e.g., by its MAC address, SID, or DDID) with the promiscuous and potentially unmanaged PC security tier. The endpoint computing device 360 may include, for example, only one form of user authentication (e.g., password), in comparison to multiple forms of authentication (e.g., password and biometric authentication) required by endpoint computing device 350. In another example embodiment, endpoint computing device 360 may require password or other authentication of an authorized user, but may not limit the owner's ability to download, store, install, or execute content, which may be required by the endpoint computing device 350.

The endpoint computing device 370 in an embodiment may be a non-mobile computing device, such as for example, a desktop or a server. The endpoint computing device 370 in an example embodiment may be associated within a security profile identifying the endpoint computing device 370 (e.g., by its MAC address, SID, or DDID) with the physically secured security tier. Such a non-mobile computing device in an embodiment may be located, for example, on the physically secured campus of a business.

The endpoint computing device 380 in an embodiment may comprise any endpoint computing device accessible by the MDM platform via out-of-band controls, and may be any mobile or non-mobile endpoint computing device, or an Internet of Things sensor device. The endpoint computing device 380 in an example embodiment may be associated within a security profile identifying the endpoint computing device 380 (e.g., by its MAC address, SID, or DDID) with the out-of-band, highest available security tier. As described above, this may be needed due to the sensitive nature of the data communicated through such an out-of-band control channel, and the access granted to the MDM via such a channel. By isolating such out-of-band control channels to a single network slice in an embodiment, the secure network slice orchestration system operating at the secure network slice orchestrator 330, pursuant to instructions transmitted from the CSM platform 341, the secure network slice orchestration system may disallow cross-access between communications in these out-of-band control channels and communications involving less secure endpoint computing devices (e.g., 350 or 360).

In still other embodiments, security profiles for any one of the endpoint computing devices 350, 360, 370, or 380, for example, may identify a level of encryption applied to data stored upon, or transmitted therefrom, or may detail other security methods applied by the endpoint computing devices that are known in the art. Other embodiments may also group endpoint computing devices based on a combination of security and performance (e.g., available bandwidth, latency, QoS) requirements at an endpoint computing device. Still other embodiments may group endpoint computing devices into security tiers based on operations, other than communication of sensitive performance/security metrics to an MDM, executing at the endpoint computing device. For example, a CSM administrator in an embodiment may designate a lowest or least secure tier to include endpoint computing devices known to engage in potentially dangerous activities, such as online shopping, downloading of unknown or untrustworthy content, or routinely accessing sites lacking authentic certificates.

The CSM platform 341 in an embodiment may communicate with the secure network slice orchestrator 330, which may be located remotely (e.g., at a 5G base station, gNodeB, or femtocell) from the cloud-based environment 340 in which the CSM platform 341 operates. For example, the secure network slice orchestrator 330 may establish a wireless connection to the CSM platform 341 via one of the WWAN interface devices operating at the RAN system 320. The CSM platform 341 in an embodiment may communicate to the secure network slice orchestrator 330 the number of security tiers in which each of the endpoint computing devices registered at the CSM platform 341 may be placed. As described above with reference to FIG. 2, this information, along with QoS metrics associated with radio frequency spectrum portions received at the RAN system 320 from the core network system may inform the number of network slices into which the secure network slice orchestrator 330 separates these radio frequency spectrum portions.

Upon establishment of each of the network slices, based on the number of security tiers and the QoS metrics, the secure network slice orchestrator 330 in an embodiment may communicate the identity and QoS metrics associated with each of these established network slices to the CSM platform 341. For example, the secure network slice orchestrator 330 may transmit an identification of network slices in the 5G NRFR1 low-band (e.g., below 1 GHz), the 5G NRFR1 mid-band (e.g., between 1 GHz and 6 GHz), and 5G mm-Wave NRFR2 high-band (e.g., above 6 GHz), made available at the RAN system 320 for distribution to the endpoint computing devices (e.g., 350, 360, 370, or 380). In some embodiments, the secure network slice orchestrator 330 may transmit an identification of a plurality of network slices within a single band (e.g., a plurality of network slices within the 5G mm-Wave NRFR2 high-band, as described above with reference to FIG. 2).

The CSM platform administrator in an embodiment may associate each security tier created to describe groups of endpoint computing devices with one or more of the network slices made available by the secure network slice orchestrator 330, at the RAN system 320. For example, the CSM platform administrator in an embodiment may associate the limited access/restricted PC security tier that includes endpoint computing device 350 with the 5G mm-Wave NRFR2 high-band (e.g., above 6 GHz). As another example, the CSM platform administrator in an embodiment may associate the promiscuous and potentially unmanaged PC security tier that includes endpoint computing device 360 with the 5G NRFR1 mid-band (e.g., between 1 GHz and 6 GHz). As yet another example, the CSM platform administrator in an embodiment may associate the physically secured security tier that includes endpoint computing device 370 with a 5G NRFR1 private low-band (e.g., below 1 GHz). In still another example, the CSM platform administrator in an embodiment may associate the out-of-band controls tier that includes endpoint computing device 380 with a 5G NRFR1 public low-band (e.g., below 1 GHz). These are a few examples of ways in which various network slices may be associated with various security tiers. In other examples, higher rated security tiers (e.g., out-of-band controls or physically secured) may be associated with only private networks (e.g., private low-band). It is contemplated administrators of the CSM platform 341 may associate any one or more security tiers with any one or more network slice available via the secure network slice orchestrator 330 in an embodiment, so long as only endpoint computing devices assigned to the same network slice fall within the same security tier.

In some embodiments, a single security tier may be associated with a plurality of 5G communication bands. For example, as described above with reference to FIG. 2, the secure network slice orchestrator 230 may establish separate WWAN virtual access points 231, 232, 233, and 234, each facilitating communication within a different sub-portion of the 5G mm-Wave NRFR2 high-band (e.g., above 6 GHz) of the 5G communication system. Returning to FIG. 3, in such an embodiment, each of the security tiers may be assigned to one of these WWAN virtual access points (e.g., 331, 332, 333, and 334), such that endpoint computing devices from each of the security tiers in an embodiment may access the 5G NRFR2 high-band of the 5G communication system, which may provide the greatest bandwidth and lowest latency available. In such a way, the secure network slice orchestrator 330 may facilitate communications between endpoint computing devices (e.g., 350, 360, 370, or 380) of varying security tiers and the RAN system 320 that both satisfy the performance requirements of each endpoint computing device, and ensures that endpoint computing devices sharing the same network slice fall within the same security tier. For example, the secure network slice orchestrator 330 may allow endpoint computing device 350 within the limited access/restricted PC security tier to access the 5G mm-Wave NRFR2 high-band (e.g., above 6 GHz), only within the frequencies 45 GHz to 52 GHz. As another example, the secure network slice orchestrator 330 may allow endpoint computing device 360 within the promiscuous and potentially unmanaged PC security tier to access the 5G mm-Wave NRFR2 high-band only within the frequencies 38 GHz to 45 GHz. As yet another example, the secure network slice orchestrator 330 may allow endpoint computing device 370 within the physically secure security tier to access the 5G mm-Wave NRFR2 high-band only within the frequencies 31 GHz to 38 GHz. In still another example, the secure network slice orchestrator 330 may allow endpoint computing device 380 within the out-of-band control security tier to access the 5G mm-Wave NRFR2 high-band only within the frequencies 24 GHz to 31 GHz.

Upon associating each of the security tiers with one or more available network slices, or sub-portions thereof, the CSM platform 341 in an embodiment may associate an endpoint computing device with a network slice or sub-portion thereof, within the security profile for that endpoint computing device, as stored as the security profile storage 342. For example, the CSM platform 341 in an embodiment may associate endpoint computing device 350, belonging to the limited access/restricted PC security tier, with a first network slice (e.g., network slice 224 described with reference to FIG. 2) facilitating communication within the 5G mm-Wave NRFR2 high-band, above 6 GHz, also associated with the limited access/restricted PC security tier. In an embodiment in which the secure network slice orchestrator 330 makes a single band (e.g., 5G mm-Wave NRFR2 high-band) available to multiple security tiers via a plurality of network slices, network slice 224 to which the CSM platform 341 has associated endpoint computing device 350 (e.g., belonging to the limited access/restricted PC security tier) may facilitate communication within the a sub-portion of the 5G mm-Wave NRFR2 high-band, between 45 and 52 GHz.

As another example, the CSM platform 341 in an embodiment may associate endpoint computing device 360, belonging to the promiscuous and potentially unmanaged PC security tier, with a second network slice (e.g., network slice 225 described with reference to FIG. 2) facilitating communication within the 5G NRFR1 mid-band, between 1 GHz and 6 GHz, and also associated with the promiscuous and potentially unmanaged PC security tier. In an embodiment in which the secure network slice orchestrator 330 makes a single band (e.g., 5G mm-Wave NRFR2 high-band) available to multiple security tiers via a plurality of network slices, the CSM platform 341 may also associate endpoint computing device 360, belonging to the promiscuous and potentially unmanaged PC security tier, with a third network slice (e.g., network slice 223 described with reference to FIG. 2) facilitating communication within the 5G mm-Wave NRFR2 high-band, between 38 and 45 GHz.

As yet another example, the CSM platform 341 in an embodiment may associate endpoint computing device 370, belonging to the physically secure security tier, with a network slice (e.g., network slice 226 described with reference to FIG. 2) facilitating communication within the 5G NRFR1 private low-band, between 1 GHz and 6 GHz, and also associated with the physically secure security tier. In an embodiment in which the secure network slice orchestrator 330 makes a single band (e.g., 5G mm-Wave NRFR2 high-band) available to multiple security tiers via a plurality of network slices, the CSM platform 341 may also associate endpoint computing device 370, belonging to the physically secure security tier, with a network slice (e.g., network slice 222 described with reference to FIG. 2) facilitating communication within the 5G mm-Wave NRFR2 high-band, between 31 and 38 GHz.

In yet another example, the CSM platform 341 in an embodiment may associate endpoint computing device 380, belonging to the out-of-band control security tier, with a network slice (e.g., network slice 227 described with reference to FIG. 2) facilitating communication within the 5G NRFR1 public low-band, between 1 GHz and 6 GHz, and also associated with the out-of-band control security tier. In an embodiment in which the secure network slice orchestrator 330 makes a single band (e.g., 5G mm-Wave NRFR2 high-band) available to multiple security tiers via a plurality of network slices, the CSM platform 341 may also associate endpoint computing device 380, belonging to the out-of-band control security tier, with a network slice (e.g., network slice 221 described with reference to FIG. 2) facilitating communication within the 5G mm-Wave NRFR2 high-band, between 24 and 31 GHz.

Because each of these bands (e.g., low-band, mid-band, and high-band) may provide differing QoS parameters, and the wireless link quality of service the endpoint computing devices will need may vary over time, each endpoint computing device may need to communicate in each of these bands at different times, regardless of the security tier to which they are assigned. By assigning network slices from multiple bands to a single security tier, or specific combination thereof, the secure network slice orchestration system may allow endpoint computing devices to communicate in a band sufficient to meet its quality of service needs, while still ensuring only endpoint computing devices sharing the same security tier may communicate within a single assigned frequency range (e.g., network slice or sub-portion thereof).

The CSM platform 341 in an embodiment may then create a communication profile for each of the registered endpoint computing devices to facilitate negotiation of wireless links between the endpoint computing devices and the RAN system 320. Such a communication profile in an embodiment may at least identify the endpoint computing device by one or more unique device ID identification codes (e.g., by MAC address, SSID, or DDID), and the one or more network slices or sub-portions thereof to which the endpoint computing device has been granted access by the CSM platform 341. While the security profile for an endpoint computing device may contain this information, it may also contain more sensitive information, such as the security tier to which the endpoint computing device belongs, the types of security measures in place at each endpoint computing device, and a list of authorized users of that device. Because the communications profile is intended only to ensure that endpoint computing devices may access only the network slice or sub-portion thereof the CSM platform 341 has authorized it to access, the communications profile need only include the endpoint computing device ID and identification of the one or more network slices to which the CSM platform 341 has granted it access. Additional authorization data may also be included in the communications profile including identification of a WWAN virtual access point address or addresses of assigned network slices, or other encryption, pass codes, or security measure for accessing a network slice assigned as needed. Such additional authorization information may be provided accruing to security authorization schemes for establishing secure communication wireless links as known in the art.

The CSM platform 341 in an embodiment may transmit the communications profile thus created, to each of the endpoint computing devices (e.g., 350, 360, 370, or 380). In such an embodiment, the communications profile may also include instructions for the endpoint computing device to transmit the communications profile, or information stored therein (e.g., device ID and network slice ID) to the secure network slice orchestrator 330 when requesting access to a network slice. Upon receipt of these communication profiles at the endpoint computing devices (e.g., 350, 360, 370, or 380) in an embodiment, each of the endpoint computing devices may be ready for use by the end-user (e.g., employee), and for communication via the 5G cellular network.

The CSM platform 341 in an embodiment may also transmit the communications profile for each of the endpoint computing device (or a compilation of the information stored therein) to the secure network slice orchestrator 330. In another embodiment, the secure network slice orchestrator 330 may be capable of accessing the communications profiles stored at the security profile storage 342 directly. In either or both embodiments, the secure network slice orchestrator 330 may be capable of accessing communications profiles (either received from the CSM platform 341 or stored at the security profile storage 342) to ensure the endpoint computing device requesting access to a given network slice or sub-portion thereof is associated with that network slice or sub-portion thereof within the communications profile for that endpoint computing device, as received from the CSM platform 341 or stored at the security profile storage 342. In an embodiment, the CSM platform 341 may also transmit an instruction to the secure network slice orchestrator 330 to allow any endpoint computing devices requesting access to a given network slice identified within its communication profile to access that given network slice. As described in greater detail below with respect to FIG. 4, the secure network slice orchestrator 330 may then only grant endpoint computing devices that are thus authorized to access a requested network slice access to that requested network slice.

Figure 4:
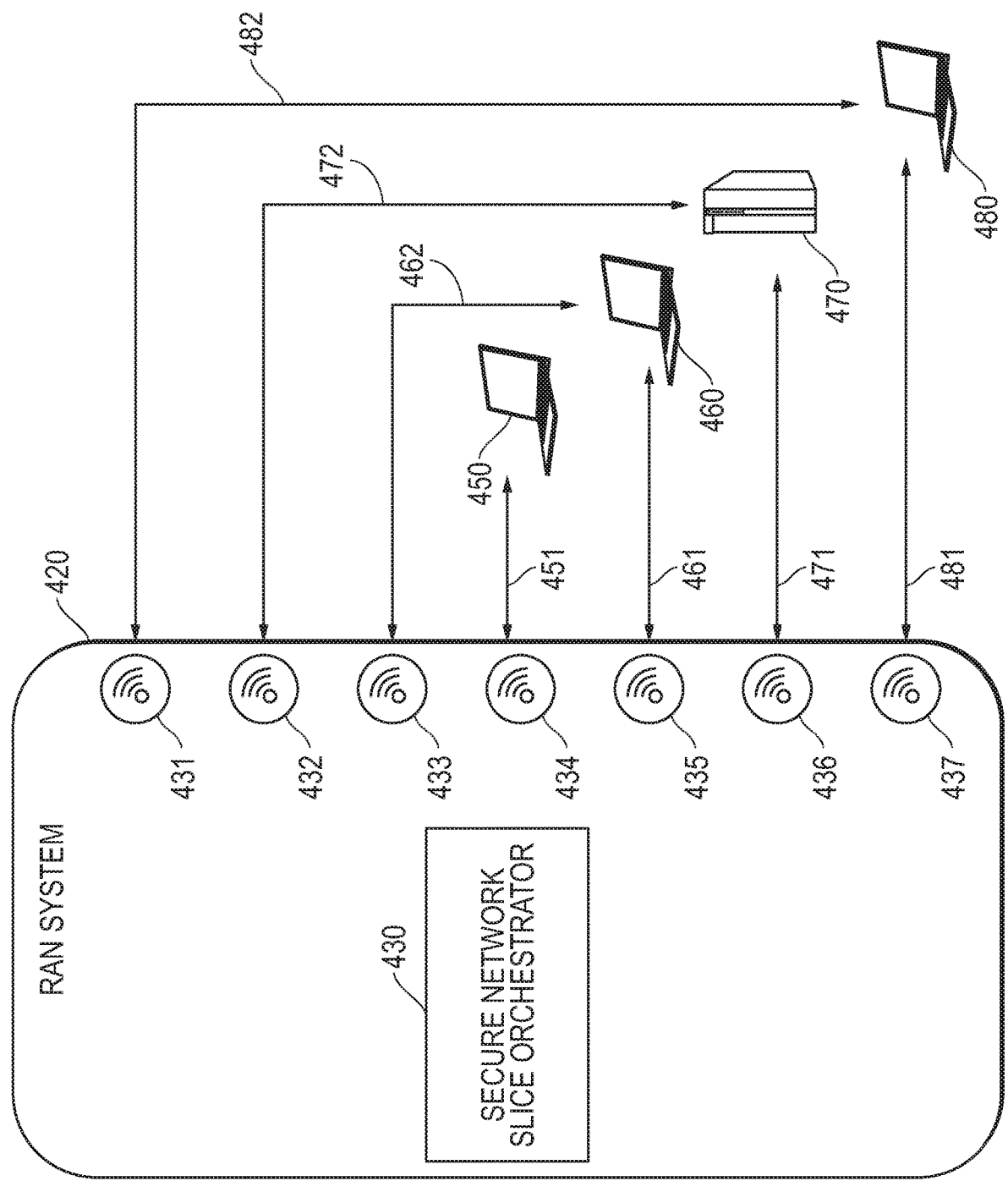
FIG. 4 is a block diagram illustrating the secure network slice orchestrator granting an endpoint computing device access to a network slice associated with the device according to an embodiment of the present disclosure.

FIG. 4 is a block diagram illustrating the secure network slice orchestrator granting an endpoint computing device access to a network slice associated with the endpoint computing device in a communications profile according to an embodiment of the present disclosure. One or more endpoint computing devices (e.g., 450, 460, 470, or 480) may request access to one or more network slices, via the secure network slice orchestrator 430 of the secure network slice orchestration system in an embodiment. In some embodiments, a single endpoint computing device may request multiple network slices.

The secure network slice orchestrator 430 at the RAN system 420 may, working in tandem with an SDN controller in an embodiment, have established a plurality of WWAN virtual access points (e.g., 431, 432, 433, 434, 435, 436, and 437) via one or more WWAN interface devices and 5G enabled antenna systems for communication with a plurality of endpoint computing devices, within each of the established network slices. The RAN system 420 may be a gNodeB system, femtocell, or other 5G base station with plural 5G enabled antenna systems. The RAN system 420 may further have an SDN controller or other processing capabilities for executing code of the secure network slice orchestrator 430 and SDN code instructions for partitioning the plurality of WWAN virtual access points (e.g., 431, 432, 433, 434, 435, 436, and 437) at the WWAN interface device or devices. In some embodiments, the network slices associated with WWAN virtual access points (e.g., 431, 432, 433, 434, 435, 436, and 437) may transceive in different 5G bands (e.g., NRFR2 high-band, NRFR1 mid-band, or NRFR1 low-band) than one another. For example, as described in greater detail with respect to FIG. 2, WWAN virtual access point 435 (correlating to WWAN virtual access point 235 in FIG. 2) may be established for communication within a network slice (e.g., 225) transceiving data within the 5G NRFR1 mid-band. As another example, WWAN virtual access point 436 (correlating to WWAN virtual access point 236 in FIG. 2) may be established for communication within a network slice (e.g., 226) transceiving data within the 5G NRFR1 private low-band. In yet another example, WWAN virtual access point 437 (correlating to WWAN virtual access point 237 in FIG. 2) may be established for communication within a network slice (e.g., 227) transceiving data within the 5G NRFR1 public low-band.

In some embodiments, the network slices may transceive in different sub-portions of the same 5G band (e.g., NRFR2 high-band, NRFR1 mid-band, or NRFR1 low-band). For example, as described in greater detail with respect to FIG. 2, WWAN virtual access point 431 (correlating to WWAN virtual access point 231 in FIG. 2) may be established for communication within a network slice (e.g., 221) transceiving data within the 5G mm-Wave NRFR2 high-band, or a sub-portion thereof (e.g., between 24 GHz and 31 GHz). As another example, WWAN virtual access point 432 (correlating to WWAN virtual access point 232 in FIG. 2) may be established for communication within a network slice (e.g., 222) transceiving data within the 5G mm-Wave NRFR2 high-band, or a sub-portion thereof (e.g., between 31 GHz and 38 GHz). In yet another example, WWAN virtual access point 433 (correlating to WWAN virtual access point 233 in FIG. 2) may be established for communication within a network slice (e.g., 223) transceiving data within the 5G mm-Wave NRFR2 high-band, or a sub-portion thereof (e.g., between 38 GHz and 45 GHz). In still another embodiment, WWAN virtual access point 434 (correlating to WWAN virtual access point 234 in FIG. 2) may be established for communication within a network slice (e.g., 224) transceiving data within the 5G mm-Wave NRFR2 high-band, or a sub-portion thereof (e.g., between 45 GHz and 52 GHz).

The endpoint computing devices (e.g., 450, 460, 470, or 480) in an embodiment may request access to the network slice(s) identified in the security profiles received from the CSM platform (e.g., as described above with reference to FIG. 3) by transmitting information stored within the communications profile received at that endpoint computing device from the CSM platform. Such information may include at least an identification of the endpoint computing device via a unique device ID identification code (e.g., by MAC address, SSID, or DDID). Thus, each endpoint computing device may transmit its device ID and a request to access the network slice or sub-portion thereof stored in the communication profile for that endpoint computing device. For example, endpoint computing device 450 may transmit its device ID and a request to access the 5G mm-Wave NRFR2 high-band network slice, above 6 GHz, or a sub-portion thereof as stored in the communication profile for endpoint computing device 450. As another example, endpoint computing device 460 may transmit its device ID and a request to access the 5G NRFR1 mid-band network slice, between 1 GHz and 6 GHz, or a sub-portion thereof, as stored in the communication profile for endpoint computing device 460. As yet another example, endpoint computing device 470 may transmit its device ID and a request to access a private 5G NRFR1 low-band network slice, below 1 GHz, or a sub-portion thereof as stored in the communication profile for endpoint computing device 470. In yet another example, endpoint computing device 480 may transmit its device ID and a request to access the public 5G NRFR1 low-band network slice, below 1 GHz, or a sub-portion thereof as stored in the communication profile for endpoint computing device 480. These are only a few examples of the types of network slices or sub-portions thereof that may be requested by endpoint computing devices, and are meant to be illustrative rather than limiting. In some embodiments, additional information may be provided in the communications profile provided to the endpoint computing device including identification or address of one or more WWAN virtual access points assigned for network slice communications by that endpoint computing device. In other embodiments, the communications profile may further include some indication of a security profile assignment, encryption, or other authorization data for access to an assigned WWAN virtual access point for communications on an assigned network slice. Authorization data may include an encryption code, password, or other data as additional authentication for access to a network slice via a WWAN virtual access point.

In other aspects, more than one of the endpoint computing devices (e.g., 450, 460, 470, or 480) may request access to the same communications band. For example, endpoint computing device 450 may transmit its device ID and a request to access a sub-portion of the 5G mm-Wave NRFR2 high-band network slice, between 45 GHz and 52 GHz, as stored in the communication profile for endpoint computing device 450. As another example, endpoint computing device 460 may transmit its device ID and a request to access a sub-portion of the 5G mm-Wave NRFR2 high-band network slice, between 38 GHz and 45 GHz, as stored in the communication profile for endpoint computing device 460. As yet another example, endpoint computing device 470 may transmit its device ID and a request to access a sub-portion of the 5G mm-Wave NRFR2 high-band network slice, between 31 GHz and 38 GHz, as stored in the communication profile for endpoint computing device 470. In still another example, endpoint computing device 480 may transmit its device ID and a request to access a sub-portion of the 5G mm-Wave NRFR2 high-band network slice, between 24 GHz and 31 GHz, as stored in the communication profile for endpoint computing device 480.

The secure network slice orchestration system operating at the secure network slice orchestrator 430 and RAN system 420 may initiate an authentication procedure for each of the endpoint computing devices (e.g., 450, 460, 470, or 480) prior to allowing access to the backend 5G communication network. For example, the secure network slice orchestration system may determine whether the device ID for the requesting endpoint computing device is associated with the requested network slice, based on information received from the CSM platform (e.g., as described above with reference to FIG. 3). If the device ID for the requesting endpoint computing device (e.g., 450, 460, 470, or 480) is not associated with the requested network slice or other authorization is not met according to techniques in the art, the secure network slice orchestrator 430 may disallow transceiving of data within the requested network slice with that endpoint computing device. However, if the device ID for the requesting endpoint computing device (e.g., 450, 460, 470, or 480) is associated with the requested network slice in an embodiment, the secure network slice orchestration system operating at the secure network slice orchestrator 430 may enable communication within the requested network slice via one or more of the WWAN virtual access points (e.g., 431, 432, 433, 434, 435, 436, or 437) at the RAN system 420.

Upon verification by the secure network slice orchestration system that the endpoint computing device requesting access to a network slice is authorized to access that network slice, the secure network slice orchestrator 430 may allow the requesting endpoint computing device (e.g., 450, 460, 470, or 480) to establish a wireless link with one of more of the WWAN virtual access points (e.g., 431, 432, 433, 434, 435, 436, or 437). Each of the endpoint computing devices (e.g., 450, 460, 470, or 480) may communicate with the secure network slice orchestrator system 430 via a wireless link communicatively coupling the endpoint computing device to one or more of the virtual access points (e.g., 431, 432, 433, 434, 435, 436, or 437) established for communication between the RAN system 420 and the endpoint computing devices. For example, wireless link 451 may communicatively couple the endpoint computing device 450 with the RAN system 420 via virtual access point 434. As another example, wireless link 461 may communicatively couple the endpoint computing device 460 with the RAN system 420 via virtual access point 435. As yet another example, wireless link 471 may communicatively couple the endpoint computing device 470 with the RAN system 420 via virtual access point 436. In still another example, wireless link 481 may communicatively couple the endpoint computing device 480 with the RAN system 420 via virtual access point 437.

In some embodiments, an endpoint computing device (e.g., 460, 470, or 480) may communicate with the RAN system 420 and secure network slice orchestrator system 430 via a plurality of wireless links. For example, in addition to wireless link 461, communicatively coupling the endpoint computing device 460 with the RAN system 420 via virtual access point 435, wireless link 462 may communicatively couple the endpoint computing device 460 with the RAN system 420 via virtual access point 433. As another example, in addition to wireless link 471 communicatively coupling the endpoint computing device 470 with the RAN system 420 via virtual access point 436, wireless link 472 may communicatively couple the endpoint computing device 470 with the RAN system 420 via virtual access point 432. In still another example, in addition to wireless link 481 communicatively coupling the endpoint computing device 480 with the RAN system 420 via virtual access point 437, wireless link 482 may communicatively couple the endpoint computing device 480 with the RAN system 420 via virtual access point 431.

As described herein, WWAN virtual access points 431, 432, 433, and 434 may transceive data within the same frequency band (e.g., 5G mm-Wave NRFR2 high-band above 6 GHz). This may be achieved, for example, by allocating a portion of the shared frequency band to each network slice and the WWAN virtual access point servicing it. By offering a separate network slice to endpoint computing devices falling within each of the security tiers, where each of the separate network slices transceive in the same frequency band (e.g., 5G mm-Wave NRFR2 high-band), the secure network slice orchestrator 430 may allow endpoint computing devices from each of the security tiers to transceive data within the same frequency band, while still ensuring devices sharing the same network slice are associated with the same security tier. Because some network slices are associated with higher QoS metrics than others, this may ensure that endpoint computing devices (e.g., 450, 460, 470, or 480) from each security tier may receive similar wireless link performance to one another.

Endpoint computing devices (e.g., 450, 460, 470, or 480) may thus establish more than one wireless link, each operating in a separate network slice, frequency band, or frequency channel, with the RAN system 420 in an embodiment. For example, endpoint computing device 460 may establish wireless link 462, transceiving within the 5G mm-wave NRFR2 high-band (e.g., above 6 GHz, or between 38 GHz and 45 GHz), in addition to wireless link 461 transceiving within the 5G NRFR1 mid-band network slice (e.g., between 1 GHz and 6 GHz). As another example, endpoint computing device 470 may establish wireless link 472, transceiving within the 5G mm-wave NRFR2 high-band (e.g., above 6 GHz, or between 31 GHz and 38 GHz), in addition to wireless link 471 transceiving within the private 5G NRFR1 low-band network slice (e.g., below 1 GHz). In yet another example, endpoint computing device 480 may establish wireless link 482, transceiving within the 5G mm-wave NRFR2 high-band (e.g., above 6 GHz, or between 24 GHz and 31 GHz), in addition to wireless link 481 transceiving within the public 5G NRFR1 low-band network slice (e.g., below 1 GHz). In such a way, the secure network slice orchestrator 430 may work in tandem with the RAN system 420 and the CSM platform to ensure that an endpoint computing device may communicate, through the RAN system 420, only within a network slice, or sub-portion thereof, that is assigned to the endpoint computing device by the CSM platform, based on a security profile for that endpoint computing device.

Figure 5:
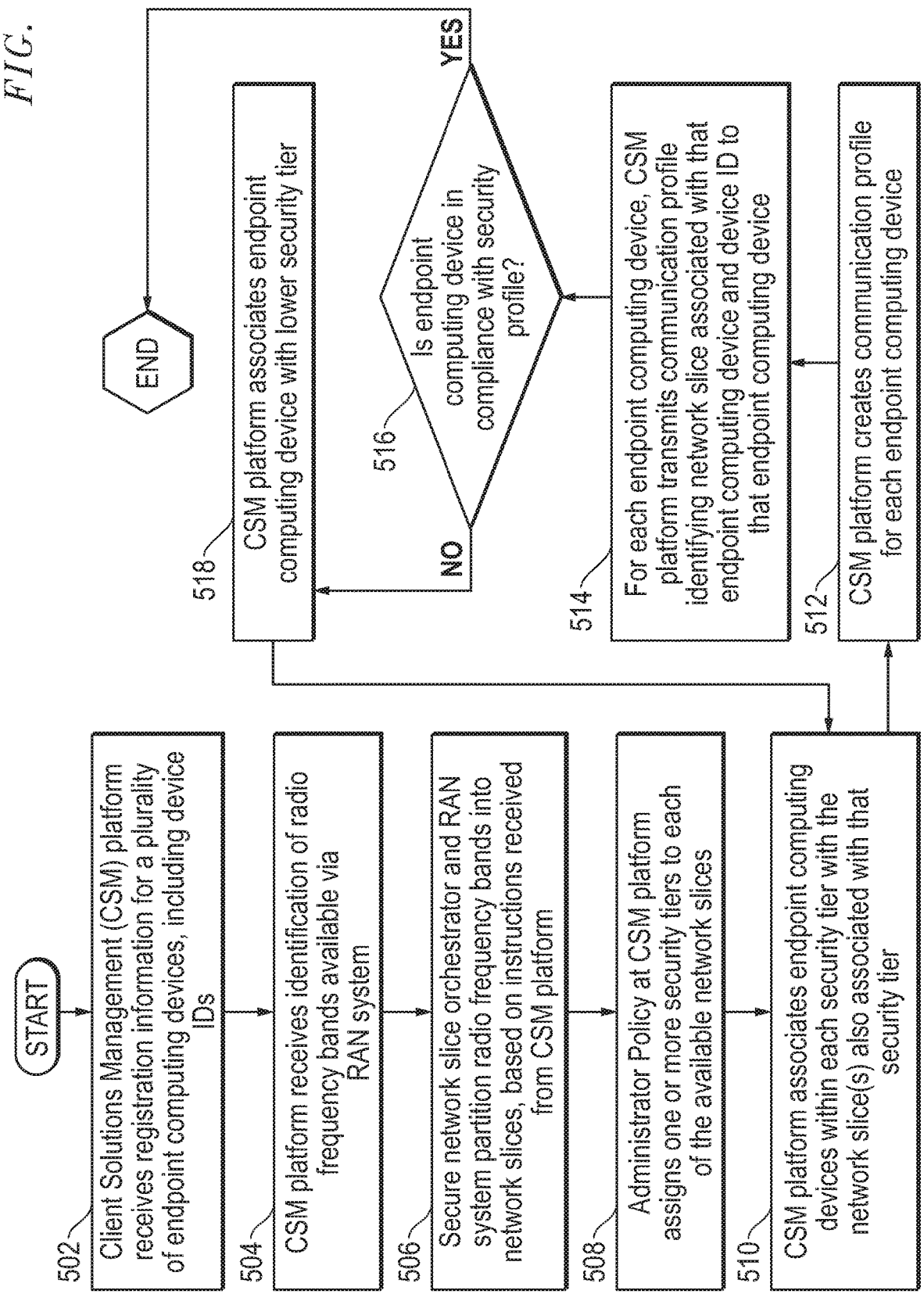
FIG. 5 is a flow diagram illustrating a method of associating a network slice with a plurality of endpoint computing devices according to an embodiment of the present disclosure.

FIG. 5 is a flow diagram illustrating a method of associating a network slice with a plurality of endpoint computing devices, based on security profiles for those endpoint computing devices according to an embodiment of the present disclosure. As described herein, the secure network slice orchestration system in an embodiment may assign 5G network slices to multiple endpoint computing devices, while ensuring all endpoint computing devices sharing a single network slice are also assigned to the same security tier. As described with reference to FIG. 5, the administrator of a client solutions management (CSM) platform in an embodiment may assign each endpoint computing system a security tier describing the security parameters or restrictions in place at that endpoint computing device.

At block 502, the CSM platform in an embodiment may receive registration information for a plurality of endpoint computing devices, including device IDs. For example, in an embodiment described with reference to FIG. 3, each of the endpoint computing devices (e.g., 350, 360, 370 or 380) in an embodiment may be registered with the CSM platform 341 within the secure network slice orchestration system 330, prior to use of the endpoint computing devices by end user (e.g., employees of a company managing each of the endpoint computing devices (e.g., 350, 360, 370 or 380).

The CSM platform 341 in an embodiment may track which information handling system endpoint computing devices are issued to which employees, or limitations that have been placed on one or more endpoint computing devices in order to ensure secure operations of that endpoint computing device and security of data stored thereon. Examples of such limitations may include password or other authentication of users, limiting a user's ability to download data or applications to the endpoint computing device, or encryption of data stored on the endpoint computing device. Each of these security requirements or limitations may be associated with a single endpoint computing device in an embodiment at a security profile associated with the endpoint computing device and stored at the security profile storage 342 prior to any of the endpoint computing devices (e.g., 350, 360, 370, or 380) requesting access to a network slice. Such registration may include transmitting an identification (e.g., MAC address, SID, or DDID) of each of the endpoint computing devices 350, 360, 370, and 380 to the CSM platform 341 for storage at the security profile storage 342, and may be performed, for example, by an IT professional employed by the company.

Endpoint computing devices (e.g., 350, 360, 370, or 380) in an embodiment may be grouped into security groups or tiers by a CSM platform tracking which endpoint computing devices are issued to which employees, which employees may access a given endpoint computing device, or tracking limitations that have been placed on one or more endpoint computing devices in order to ensure secure operations of that endpoint computing device and security of data stored thereon. Such an assignment of a security group or tier assigned to an endpoint computing device may be made based on the security provided at each endpoint computing device, and reflected in a security profile created by an administrator for the CSM platform 341. For example, the endpoint computing device 350 in an example embodiment may be associated within a security profile identifying the endpoint computing device 350 (e.g., by its MAC address, SID, or DDID) with the limited access/restricted PC security tier. As another example, the endpoint computing device 360 may be associated within a security profile identifying the endpoint computing device 360 (e.g., by its MAC address, SID, or DDID) with the promiscuous and potentially unmanaged PC security tier. In yet another example, the endpoint computing device 370 in an embodiment may be a non-mobile computing device, such as for example, a desktop or a server, and may be associated within a security profile identifying the endpoint computing device 370 (e.g., by its MAC address, SID, or DDID) with the physically secured security tier. In still another example, the endpoint computing device 380 may comprise any endpoint computing device accessible by the MDM platform via out-of-band controls, and may be associated within a security profile identifying the endpoint computing device 380 (e.g., by its MAC address, SID, or DDID) with the out-of-band, highest available security tier.

The CSM platform in an embodiment may receive an identification of radio frequency bands available via a RAN system, such as a gNodeB for example, at block 504. For example, in an embodiment described with reference to FIG. 2, the core network system 210 may have access to a first spectrum portion 211 including the 5G mm-wave NRFR2 high-band (e.g., above 6 GHz, or between 24 GHz and 52 GHz), a second spectrum portion 212 including the NRFR1 mid-band (e.g., below 6 GHz and above 1 GHz), and a third spectrum portion 213 including NRFR1 low-band (e.g., below 1 GHz). In an embodiment, the core network system 210 may make each of these available radio frequency spectrum portions available to a RAN system 220 via wired or wireless connection between the 5G cell tower and the RAN system 220. The secure network slice orchestrator 230, operating in tandem with the RAN system 220 may then transmit an identification of each of the radio frequency bands made available at the RAN system 220, as well as performance characteristics of each band, to the CSM platform.

A processor or controller executing code instructions of the secure network slice orchestrator at the RAN system in an embodiment may partition the radio frequency bands received via the core system into a plurality of network slices as defined via SDN, based on instructions received from the CSM platform. For example, in an embodiment described with reference to FIG. 3, the CSM platform 341 in an embodiment may communicate to the secure network slice orchestrator 330 the number of security tiers in which each of the endpoint computing devices registered at the CSM platform 341 may be placed. This information, along with QoS metrics associated with radio frequency spectrum portions received at the RAN system 320 from the core network system may inform the number of network slices into which the secure network slice orchestrator 330 separates these radio frequency spectrum portions.

In an embodiment described with reference to FIG. 2, the RAN system 220, having one or more 5G enabled WWAN interface devices and antenna systems working in tandem with the secure network slice orchestrator 230 and SDN, in an embodiment may separate traffic into a plurality of network slices, based, at least in part, upon the number of security tiers to which endpoint computing devices in communication with the RAN system 220 may belong. By establishing at least one network slice for each identified security tier in an embodiment, the secure network slice orchestrator 230 may avoid cross-access or security breaches between an endpoint computing device in a first security tier, transceiving in a first network slice, and a second endpoint computing device in a second (e.g., potentially less secure) security tier, transceiving in a second network slice.

In other aspects, the secure network slice orchestrator 230 may define the number of network slices into which available radio frequency spectra may be separated based, at least in part, upon QoS metrics. For example, as described above, each of the radio frequency spectrum sub-portions 211, 212, and 213 may provide different QoS metrics (e.g., higher bandwidth at 211, greater coverage at 213). In order to provide the benefits of a given radio frequency spectrum sub-portion (e.g., higher bandwidth of 211) to endpoint computing devices in a plurality of security tiers, while still maintaining a separate network slice for each security tier, the secure network slice orchestrator may establish a separate network slice for each security tier, within a single radio frequency spectrum portion received from the core network 210. For example, in an embodiment in which there are four security tiers, the secure network slice orchestrator 230 may establish four separate network slices, each transceiving within the 5G mm-Wave NRFR2 radio frequency portion 211.

The RAN system 220 and the secure network slice orchestrator 230, for example, may establish a plurality of network slices from the radio spectrum portion 211 received from the core network system 210, such that each of network slices 221, 222, 223, and 224 operate within the 5G mm-Wave NRFR2 spectrum portion to provide peak data rates and extremely low latency within a limited coverage area. This may be achieved, for example, by allocating a portion of the 5G mm-Wave NRFR2 spectrum (e.g., between 24 GHz and 52 GHz) to each of the network slices (e.g., 221, 222, 223, and 224). For example, in an embodiment, the network slice 221 may facilitate communication between 24 GHz and 31 GHz, network slice 222 may facilitate communication between 31 GHz and 38 GHz, network slice 223 may facilitate communication between 38 GHz and 45 GHz, and network slice 224 may facilitate communication between 38 GHz and 45 GHz. Each of these network slices may allow for communications between the RAN system 220 and a plurality of endpoint computing devices within the same 5G band (e.g., 5G mm-wave offering the highest bandwidth and lowest latency), but such communications may be isolated from one another due to their non-overlapping frequency ranges (e.g., 24-31 GHz, 31-38 GHz, 38-45 GHz, and 45-52 GHz).

As another example, the RAN system 220 and secure network slice orchestrator 230 may establish a network slice 223 from the radio spectrum portion 212 received from the core network system 210, such that network slice 225 operates within the 5G NRFR1 mid-band spectrum portion to provide higher bandwidth and lower latency than the low-band spectrum portion. In still another example, the received from the core network system 210 in an embodiment may establish a network slices 226 and 227 from the single radio frequency spectrum portion 213. In such an embodiment, the network slices 226 and 227 may operate within the 5G NRFR1 low-band frequency spectrum portion to provide the greatest coverage available, though at lower bandwidth and higher latency than other available spectrum portions. In some embodiments, network slices 226 and 227 may provide similar or identical wireless signal metrics. In other embodiments, network slices 226 and 227 may provide different functionalities or wireless signal metrics. For example, network slice 226 in an embodiment may comprise a private 5G NRFR1 low-band network, while network slice 227 may comprise a public 5G NRFR1 low-band network.

At block 508, an administrator at the CSM platform in an embodiment may assign one or more security tiers to each of the available network slices. For example, the CSM platform administrator in an embodiment described with reference to FIG. 3 may associate the limited access/restricted PC security tier that includes endpoint computing device 350 with the 5G NRFR2 high-band (e.g., 5G mm-wave, above 6 GHz) of 5G communications radio frequencies. As another example, the CSM platform administrator in an embodiment may associate the promiscuous or an unmanaged PC security tier that includes endpoint computing device 360 (e.g., with the CSM having little or no control over outside network access or having limited information of a user's authorization) with the 5G NRFR1 mid-band (e.g., between 1 GHz and 6 GHz) of 5G communications radio frequencies. As yet another example, the CSM platform administrator in an embodiment may associate the physically secured security tier that includes endpoint computing device 370 with a private 5G NRFR1 low-band (e.g., below 1 GHz) of 5G communications radio frequencies. In still another example, the CSM platform administrator in an embodiment may associate the out-of-band controls tier that includes endpoint computing device 380 with a public 5G NRFR1 low-band (e.g., below 1 GHz) of 5G communications radio frequencies.

In some embodiments, a single communication band may be associated with a plurality of security tiers. For example, the secure network slice orchestrator 330 may allow endpoint computing device 350 within the first security tier to access the 5G NRFR2 high-band (e.g., above 6 GHz), only within the frequencies 45 GHz to 52 GHz. As another example, the secure network slice orchestrator 330 may allow endpoint computing device 360 within the promiscuous and potentially unmanaged PC security tier to access the 5G NRFR2 high-band (e.g., above 6 GHz), only within the frequencies 38 GHz to 45 GHz. As yet another example, the secure network slice orchestrator 330 may allow endpoint computing device 370 within the physically secure security tier to access the 5G NRFR2 high-band (e.g., above 6 GHz), only within the frequencies 31 GHz to 38 GHz. In still another example, the secure network slice orchestrator 330 may allow endpoint computing device 380 within the out-of-band control security tier to access the 5G NRFR2 high-band (e.g., above 6 GHz), only within the frequencies 24 GHz to 31 GHz.

The CSM platform in an embodiment may associate endpoint computing devices within a given security tier with one or more network slices, also associated with that given security tier at block 510. For example, the CSM platform 341 in an embodiment may associate all endpoint computing devices (e.g., 350) belonging to the limited access/restricted PC security tier, with a network slice (e.g., network slice 224 described with reference to FIG. 2) facilitating communication within the 5G mm-wave high-band, above 6 GHz, also associated with the limited access/restricted PC security tier. In some embodiments in which the secure network slice orchestrator 330 makes a single band available to multiple security tiers via a plurality of network slice sub-portions, the CSM platform 341 may only associate one or more endpoint computing devices (e.g., 350) belonging to the limited access/restricted PC security tier, with a network slice representing a sub-portion of a radio frequency band established at the core system (e.g., network slice 224 described with reference to FIG. 2) facilitating communication within the 5G NRFR2 high-band, between 45 GHz and 52 GHz. Other security tier assigned endpoint devices may utilize other network slices that may operate in the band range such as the 5G NRFR3 high-band at 211, such as via WWAN virtual access points 231, 232 or 233 corresponding to network slices 221, 222, or 223 respectively as described in embodiments herein.

As another example, the CSM platform 341 in an embodiment may associate endpoint computing device 360, belonging to the promiscuous and potentially unmanaged PC security tier, with a network slice (e.g., network slice 225 from FIG. 2) facilitating communication within the 5G NRFR1 mid-band, between 1 GHz and 6 GHz, and a network slice (e.g., network slice 223 from FIG. 2) facilitating communication within the 5G NRFR2 high-band, between 31 and 38 GHz, both of which may also be associated with the promiscuous and potentially unmanaged PC security tier. As yet another example, the CSM platform 341 in an embodiment may associate endpoint computing device 370, belonging to the physically secure security tier, with a network slice (e.g., network slice 226 from FIG. 2) facilitating communication within the private 5G NRFR1 low-band, below 1 GHz, and a network slice (e.g., network slice 222 from FIG. 2), facilitating communication within the 5G NRFR2 high-band, between 38 and 45 GHz, both of which may also be associated with the physical secure security tier. In yet another example, the CSM platform 341 in an embodiment may associate endpoint computing device 380, belonging to the out-of-band control security tier, with a network slice (e.g., network slice 227 from FIG. 2) facilitating communication within the public 5G NRFR1 low-band, below 1 GHz, and a network slice (e.g., network slice 221 from FIG. 2) facilitating communication within the 5G NRFR2 high-band, between 45 and 52 GHz, both of which may be associated with the out-of-band control security tier. It is contemplated that plural endpoint computing devices with common security tier designations as assigned by the CSM platform 341 may be associated with the same one or more network slices and WWAN virtual access points to maintain a commonality of security tiered endpoint devices.

At block 512, the CSM platform in an embodiment may transmit identification of endpoint computing devices and associated network slices to the secure network slice orchestrator. For example, the CSM platform 341 in an embodiment may create a communication profile for each of the registered endpoint computing devices to facilitate negotiation of wireless links between the endpoint computing devices and the RAN system 320. Such a communication profile in an embodiment may identify the endpoint computing device (e.g., by MAC address, SSID, or DDID), and the one or more network slices or sub-portions thereof to which the endpoint computing device has been granted access by the CSM platform 341.

For each endpoint computing device, the CSM platform in an embodiment may transmit an instruction to request communication via the network slice associated with that endpoint computing device to that endpoint computing device at block 514. For example, the CSM platform 341 in an embodiment may transmit the communications profile for a given endpoint computing device to that endpoint computing device (e.g., 350, 360, 370, or 380). In such an embodiment, the communications profile may also include instructions for the endpoint computing device to transmit the communications profile, or information stored therein (e.g., device ID and network slice ID) to the secure network slice orchestrator 330 when requesting access to a network slice. Upon receipt of these communication profiles at the endpoint computing devices (e.g., 350, 360, 370, or 380) in an embodiment, each of the endpoint computing devices may be ready for use by the end-user (e.g., employee), and for communication via the 5G cellular network.

At block 514, the CSM platform may routinely check to determine whether each of the endpoint computing devices is in compliance with the security profile associated with that endpoint computing device. Managers of large groups of endpoint computing devices may routinely update those devices, or may test those devices to ensure the security requirements set out in the security profile associated with that device are being followed or enforced. For example, an endpoint computing device associated with a password authentication requirement may be tested to determine whether the user has circumvented this requirement, opening the device up to potentially non-secure outside attack or access. If the endpoint computing device is in compliance with the security profile, the endpoint computing device may maintain rights to access the network slice currently assigned to that endpoint computing device, and the method may end. If the endpoint computing device is not in compliance with the security profile associated with that device, the method may proceed to block 518 to associate the endpoint computing device with a lower security tier and a network slice also associated with that lower security tier.

The CSM platform in an embodiment may associate the endpoint computing device that is not in compliance with its security profile with a lower security tier at block 518. For example, in an embodiment in which the endpoint computing device is associated with the physically secured security tier, but the endpoint computing device is identified as having been moved from the physically secure area, the endpoint computing device may be reassigned to the limited access/restricted PC or promiscuous and potentially unmanaged PC security tier. In another example, in an embodiment in which the endpoint computing device is associated with the limited access/restricted PC, but the CSM platform determines one or more of the methods for restricting access to the PC or limiting a user's ability to download and install applications has been circumvented, the CSM platform may reassign the endpoint computing device to the promiscuous and potentially unmanaged PC security tier.

The method may then proceed back to block 510 to associate the non-compliant endpoint computing device with a different network slice, also associated with the lower security tier reassigned to the endpoint computing device at block 518. The CSM platform may also transmit an updated communication profile and instruction to the non-compliant endpoint computing device to request access to the reassigned, lower security network slice, rather than the initially assigned network slice associated with the initially assigned security tier. In such a way, the secure network slice orchestration system operating across the CSM platform and the secure network slice orchestration system may ensure only endpoint computing devices meeting specific security requirements may share the same network slices. The method may then end.

Figure 6:
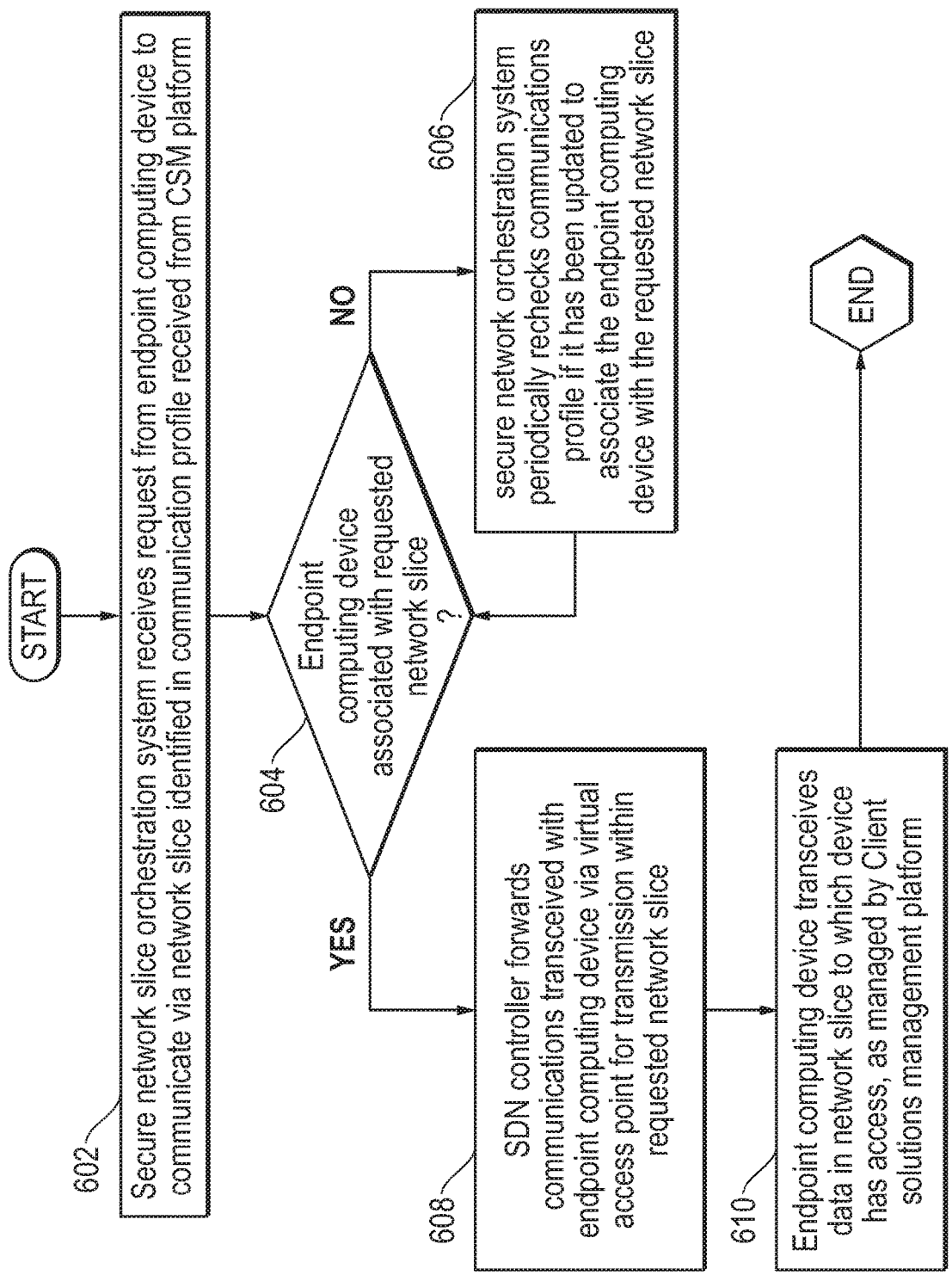
FIG. 6 is a flow diagram illustrating a method of communicatively coupling an endpoint computing device to a RAN system within a secure network slice according to an embodiment of the present disclosure.

FIG. 6 is a flow diagram illustrating a method of communicatively coupling an endpoint computing device to a RAN system within a secure network slice identified to the RAN system for the secure network slice by a CSM platform. The assignment of an endpoint computing device to be associated with one or more network slices may be based on a security profile for the endpoint computing device as determined by the CSM platform according to an embodiment of the present disclosure. As described herein, the secure network slice orchestration system in an embodiment may grant network slice access to a plurality of endpoint computing devices while ensuring, with the CSM platform, that only devices having similar security requirements share a single network slice.

At block 602, the secure network slice orchestration system of the RAN system, such as a gNodeB or other 5G enabled base station, in an embodiment may receive a request from the endpoint computing device to communicate via a specifically identified network slice. For example, in an embodiment described with reference to FIG. 4, endpoint computing device 450 may transmit its device ID and a request to access a 5G NRFR2 high-band network slice, above 6 GHz at a WWAN virtual access point at the RAN system. The device ID, at least, may be stored in the communication profile provided for endpoint computing device 450 to the RAN system in an example embodiment. The communication profile may include assignment of device ID that correspond to each of a plurality of WWAN virtual access points and corresponding network slices. Communication profile may include additional information including other authorization information such as address location of one or more WWAN virtual access points, encryption codes, pass codes, or other information for establishing a wireless link between at least one endpoint computing device and at least one WWAN virtual access point for access to a network slice. As another example, endpoint computing device 460 may transmit its device ID and a request to access a 5G NRFR1 mid-band network slice, between 1 GHz and 6 GHz. The association of the device ID and WWAN virtual access point may be stored in the communication profile for endpoint computing device 460. As yet another example, endpoint computing device 470 may transmit its device ID and a request to access a private 5G NRFR1 low-band network slice, below 1 GHz, as stored in the communication profile for endpoint computing device 470. In yet another example, endpoint computing device 480 may transmit its device ID and a request to access a public 5G NRFR1 low-band network slice, below 1 GHz, as stored in the communication profile for endpoint computing device 480.

In other aspects, more than one of the endpoint computing devices (e.g., 450, 460, 470, or 480) may request access to the same communications band. For example, endpoint computing device 450 may transmit its device ID and a request to access a network slice (e.g., 224 from FIG. 2) transceiving between 45 GHz and 52 GHz within the 5G NRFR2 high-band, as stored in the communication profile for endpoint computing device 450. As another example, endpoint computing device 460 may transmit its device ID and a request to access a network slice (e.g., 223 from FIG. 2) between 38 GHz and 45 GHz within the 5G NRFR2 high-band, as stored in the communication profile for endpoint computing device 460. As yet another example, endpoint computing device 470 may transmit its device ID and a request to access a network slice (e.g., 222 from FIG. 2) between 31 GHz and 38 GHz within the 5G NRFR2 high-band, as stored in the communication profile for endpoint computing device 470. In still another example, endpoint computing device 480 may transmit its device ID and a request to access a network slice (e.g., 221 from FIG. 2) between 24 GHz and 31 GHz within the 5G NRFR2 high-band, as stored in the communication profile for endpoint computing device 480.

The secure network slice orchestration system may determine at block 604 in an embodiment whether the endpoint computing device is associated with the specifically identified network slice. The secure network slice orchestration system in an embodiment may make such a determination based on the association made by the CSM platform between the requested network slice and one or more endpoint computing devices (e.g., as described with reference to blocks 510 and 512 of FIG. 5). As described in an embodiment with reference to FIG. 3, the CSM platform 341 in an embodiment may transmit an instruction including at least the one or more device IDs or other identifying information in the communications profile for each of the endpoint computing device to each endpoint computing device and to the secure network slice orchestrator 330 at the RAN system 320. The secure network slice orchestrator 330 in an embodiment may then reference these device IDs or other communications profiles to ensure the endpoint computing device requesting access to a given network slice is associated with that network slice within the communications profile and security profile for that endpoint computing device. In an embodiment, the CSM platform 341 may also transmit an instruction to the secure network slice orchestrator 330 to allow any endpoint computing devices requesting access to a given network slice identified within its communication profile to access that given network slice. If the endpoint computing device is not associated with the specifically identified network slice, the method may proceed to block 606 for periodic checking for updated communication profiles for that endpoint computing device. If the endpoint computing device is associated with the specifically identified network slice, the method may proceed to block 608 to grant the endpoint computing device access to the specifically identified network slice.

At block 606, in an embodiment in which the secure network orchestration system determines the endpoint computing device is not associated with the requested network slice based on device ID or other authorization information within a communication profile, the secure network orchestration system may periodically recheck for updated communications profiles for that endpoint computing device. For example, if the device ID for the requesting endpoint computing device (e.g., 450, 460, 470, or 480) is not associated with the requested network slice within a communications profile, the secure network slice orchestrator 430 may disallow transceiving of data with that endpoint computing device via the virtual access point (e.g., 431, 432, 433, 434, 435, 436, or 437) associated with that endpoint computing device. In other embodiments, the secure network slice orchestrator 430 may continue to allow communications with the virtual access point (e.g., 431, 432, 433, 434, 435, 436, or 437) established for communication with the requesting endpoint computing device, but may not communicatively couple that virtual access point (e.g., 431, 432, 433, 434, 435, 436, or 437) to a network slice made available via the RAN system 420. In such an embodiment, the secure network slice orchestration system may periodically recheck communications profiles associated with the requesting endpoint computing device to determine whether the CSM platform has updated those communications profiles including device ID or other device ID instructions to allow access to the requested network slice. If such an updated communications profile is received, the method may proceed back to block 604 to determine whether the endpoint computing device requesting access to a given network slice is associated with that network slice within the updated communications profile.

In other embodiments, while awaiting receipt of an updated communications profile, the secure network slice orchestration system may grant the endpoint computing device access to a network slice associated with a lowest available security tier. For example, the secure network slice orchestrator 430 may grant access to any requesting endpoint computing device to a network slice associated within communications profiles with the promiscuous or potentially unmanaged PC security tier.

The secure network slice orchestration system may instruct an SDN controller of the RAN system to forward communications transceived with the requesting endpoint computing device via a virtual access point for transmission within requested network slice at block 608 in an embodiment in which the endpoint computing device is associated with the requested network slice in a communications profile. For example, in an embodiment described with respect to FIG. 4, the secure network slice orchestrator 430 and the RAN system 420 may, working in tandem in an embodiment, have established a plurality of WWAN virtual access points (e.g., 431, 432, 433, 434, 435, 436, and 437) for communication with a plurality of endpoint computing devices, within each of the established network slices. Upon verification by the secure network slice orchestration system that the endpoint computing device requesting access to a network slice is authorized to access that network slice, the secure network slice orchestrator 430 may allow the requesting endpoint computing device (e.g., 450, 460, 470, or 480) to establish a wireless link with one of more of the WWAN virtual access points (e.g., 431, 432, 433, 434, 435, 436, or 437).

In some embodiments, the network slices may transceive in different 5G bands (e.g., NRFR2 high-band, NRFR1 mid-band, or NRFR1 low-band) than one another. For example, as described in greater detail with respect to FIG. 2, WWAN virtual access point 435 (correlating to WWAN virtual access point 235 in FIG. 2) may be established for communication within a network slice (e.g., 225) transceiving data within the 5G NRFR1 mid-band. As another example, WWAN virtual access point 436 (correlating to WWAN virtual access point 236 in FIG. 2) may be established for communication within a network slice (e.g., 226) transceiving data within the 5G NRFR1 private low-band. In yet another example, WWAN virtual access point 437 (correlating to WWAN virtual access point 237 in FIG. 2) may be established for communication within a network slice (e.g., 227) transceiving data within the 5G NRFR1 public low-band.

In some embodiments, the network slices may transceive in different sub-portions of the same 5G band (e.g., NRFR2 high-band, NRFR1 mid-band, or NRFR1 low-band). For example, as described in greater detail with respect to FIG. 2, WWAN virtual access point 431 (correlating to WWAN virtual access point 231 in FIG. 2) may be established for communication within a network slice (e.g., 221) transceiving data within the 5G mm-Wave NRFR2 high-band, or a sub-portion thereof (e.g., between 24 GHz and 31 GHz). As another example, WWAN virtual access point 432 (correlating to WWAN virtual access point 232 in FIG. 2) may be established for communication within a network slice (e.g., 222) transceiving data within the 5G mm-Wave NRFR2 high-band, or a sub-portion thereof (e.g., between 31 GHz and 38 GHz). In yet another example, WWAN virtual access point 433 (correlating to WWAN virtual access point 233 in FIG. 2) may be established for communication within a network slice (e.g., 223) transceiving data within the 5G mm-Wave NRFR2 high-band, or a sub-portion thereof (e.g., between 38 GHz and 45 GHz). In still another embodiment, WWAN virtual access point 434 (correlating to WWAN virtual access point 234 in FIG. 2) may be established for communication within a network slice (e.g., 224) transceiving data within the 5G mm-Wave NRFR2 high-band, or a sub-portion thereof (e.g., between 45 GHz and 52 GHz).

At block 610, the endpoint computing device may transceive data in the requested network slice, as managed by the CSM platform. Each of the endpoint computing devices (e.g., 450, 460, 470, or 480) may communicate with the secure network slice orchestrator system 430 via a wireless link communicatively coupling the endpoint computing device to one or more of the virtual access points (e.g., 431, 432, 433, 434, 435, 436, or 437) established for communication between the RAN system 420 and the endpoint computing devices. For example, wireless link 451 may communicatively couple the endpoint computing device 450 with the RAN system 420 via virtual access point 434. As another example, wireless link 461 may communicatively couple the endpoint computing device 460 with the RAN system 420 via virtual access point 435. As yet another example, wireless link 471 may communicatively couple the endpoint computing device 470 with the RAN system 420 via virtual access point 436. In still another example, wireless link 481 may communicatively couple the endpoint computing device 480 with the RAN system 420 via virtual access point 437.

In some embodiments, an endpoint computing device (e.g., 460, 470, or 480) may communicate with the RAN system 420 and secure network slice orchestrator system 430 via a plurality of wireless links. For example, in addition to wireless link 461, communicatively coupling the endpoint computing device 460 with the RAN system 420 via virtual access point 435, wireless link 462 may communicatively couple the endpoint computing device 460 with the RAN system 420 via virtual access point 433. As another example, in addition to wireless link 471 communicatively coupling the endpoint computing device 470 with the RAN system 420 via virtual access point 436, wireless link 472 may communicatively couple the endpoint computing device 470 with the RAN system 420 via virtual access point 432. In still another example, in addition to wireless link 481 communicatively coupling the endpoint computing device 480 with the RAN system 420 via virtual access point 437, wireless link 482 may communicatively couple the endpoint computing device 480 with the RAN system 420 via virtual access point 431.

As described herein, WWAN virtual access points 431, 432, 433, and 434 may transceive data within the same frequency band (e.g., 5G mm-Wave NRFR2 high-band above 6 GHz). This may be achieved, for example, by allocating a portion of the shared frequency band to each network slice and the WWAN virtual access point servicing it. By offering a separate network slice to endpoint computing devices falling within each of the security tiers, where each of the separate network slices transceive in the same frequency band (e.g., 5G mm-Wave NRFR2 high-band), the secure network slice orchestrator 430 may allow endpoint computing devices from each of the security tiers to transceive data within the same frequency band, while still ensuring devices sharing the same network slice are associated with the same security tier. Because some network slices are associated with higher QoS metrics than others, this may ensure that endpoint computing devices (e.g., 450, 460, 470, or 480) from the security tiers may receive similar wireless link performance to one another in some embodiments.

The blocks of the flow diagrams of FIGS. 5-6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system of a Radio Access Network (RAN) system operating a secure network slice orchestration system, comprising:

a wireless wide area network (WWAN) interface device of the RAN system transceiving data within a 5G New Radio (NR) frequency band with a first endpoint computing device;

the WWAN interface device having a processor executing code of the secure network slice orchestration system for receiving an instruction from a client solutions management (CSM) platform assign a first network slice of a plurality of network slices within the 5G NR frequency band with an identification of the first endpoint computing device, based on a security profile associating the first endpoint computing device with a security tier based on security measures adopted at the first endpoint computing device;

a software defined network (SDN) controller establishing the first network slice within a sub-portion of the 5G NR frequency band via establishing a first virtual WWAN access point at the WWAN interface device;

the SDN controller a second network slice within a second sub-portion of at least a second 5G NR frequency band of a plurality of 5G NR frequency bands that is separated from data transceived within the remainder of the plurality of 5G NR frequency bands to establish the second network slice via establishing a second virtual WWAN access point transceiving data within the second network slice;

the secure network slice orchestration system receiving an endpoint device identification code from the first endpoint device to authorize use of the first virtual WWAN access point and the secure network slice orchestration system determining a second endpoint device of the plurality of endpoint computing to authorize use of the second virtual WWAN access point; and the SDN controller and WWAN interface device transceiving data in the network slice with the first endpoint computing device via the first virtual WWAN access point.

2. The information handling system of claim 1, wherein the network slice operates in a 5G NR Frequency Range (FR) 2 mm-wave high-band including radio frequencies above 6 GHz.

3. The information handling system of claim 1, wherein the network slice operates in a 5G NR FR1 mid-band including radio frequencies between 1 GHz and 6 GHz.

4. The information handling system of claim 1, wherein the network slice operates in a 5G NR FR1 private low-band including radio frequencies below 1 GHz.

5. The information handling system of claim 1, wherein the network slice operates in a 5G NR FR1 public low-band including radio frequencies below 1 GHz.

6. The information handling system of claim 1, wherein the RAN system is a gNodeB base station with plural 5G antenna systems operating via one or more WWAN interface devices.

7. The information handling system of claim 1 further comprising:

the SDN controller establishing a plurality of network slices, each for transceiving data with endpoint computing devices assigned to different security tiers as indicated by instructions received from the CSM platform.

8. A method for establishing a network slice for transceiving data via a secure network slice orchestration system of a Radio Access Network (RAN) system, comprising:

generating, at a processor executing instructions of a client solutions management (CSM) platform, a security profile for a plurality of endpoint computing devices, including an identification of the plurality of endpoint computing devices, and associating the plurality of endpoint computing devices with one of a plurality of security tiers based on monitoring security measures in place at each of the plurality of endpoint computing devices;

transmitting a RAN system instruction to the secure network slice orchestration system at the RAN system, via a RAN network interface device, to assign to a plurality of software defined network (SDN) generated network slices within one or more 5G New Radio (NR) frequency bands within which the RAN system transceives data to an identification of the plurality of endpoint computing devices assigned to each network slice, including at least one network slice for each of the plurality of security tiers;

transmitting an endpoint computing device instruction to a first endpoint computing device assigning a virtual access point generated at a wireless wide area network (WWAN) interface device at the RAN system for transceiving data within one of the plurality of network slices assigned to a subgroup of the plurality of endpoint computing devices associated with a same one of the plurality of security tiers;

determining, via the CSM platform, that security measures in place at the first endpoint computing device have changed;

generating an updated security profile for the first endpoint computing device, associating the first endpoint computing device with an updated one of the plurality of security tiers indicating the change in security measures;

transmitting an updated RAN system instruction to the secure network slice orchestration system to assign an updated network slice corresponding to the updated security profile; and transmitting an updated endpoint computing device instruction to the first endpoint computing device associating the first endpoint computing device with the updated network slice.

9. The method of claim 8, wherein one of the plurality of security tiers is assigned to a plurality of limited access/restricted endpoint computing devices having a level of limited data or outside network access.

10. The method of claim 8, wherein one of the plurality of security tiers is assigned to a plurality of unmanaged endpoint computing devices.

11. The method of claim 8, wherein one of the plurality of security tiers is assigned to a plurality of physically secured endpoint computing devices.

12. The method of claim 8, wherein one of the plurality of security tiers is assigned to endpoint computing devices having communications via out-of-band controls.

13. The method of claim 8 further comprising:
transmitting the RAN system instruction to the secure network slice orchestration system and the instruction to each of the plurality of endpoint computing devices one or more communications profiles, each associating one of the plurality of endpoint computing devices with one or more of the plurality of network slices, based on the security profile identified for each of the plurality of endpoint computing devices enabling a match with an endpoint computing device identification to authorize communication via an assigned virtual access point at the RAN system.

14. The method of claim 8 further comprising:
establishing, via the SDN controller, a plurality of network slices, each for transceiving data with endpoint computing devices assigned to different security tiers as indicated by instructions received from the CSM platform;

determining, via the CSM platform, that security measures in place at the first endpoint computing device has changed;

generating an updated security profile for the first endpoint computing device, associating the first endpoint computing device with an updated one of the plurality of security tiers indicating the change in security measures;

transmitting an updated RAN system instruction to the secure network slice orchestration system to assign an updated network slice corresponding to the updated security profile; and transmitting an updated endpoint computing device instruction to the first endpoint computing device associating the first endpoint computing device with the updated network slice.

15. An information handling system of a Radio Access Network (RAN) system gNodeB operating a secure network slice orchestration system, comprising:
a wireless wide area network (WWAN) interface device of the gNodeB transceiving data within a plurality of 5G New Radio (NR) frequency bands with a plurality of endpoint computing devices, where the plurality of endpoint computing devices have been assigned to one of a plurality of security tiers by a client solutions management (CSM) platform monitoring security measures in place at each of the plurality of endpoint computing devices;

the WWAN interface device receiving a communications profile from the CSM platform identifying endpoint computing devices assigned to each of a plurality of network slices within the plurality of 5G NR frequency bands such that the network slices are associated with one of the plurality of security tiers;

a software defined network (SDN) controller isolating data transceived within a first sub-portion of at least one of the plurality of 5G NR frequency bands from data transceived within the remainder of the plurality of 5G NR frequency bands to establish a first network slice of the plurality of network slices;

the SDN controller isolating data transceived within a second sub-portion of at least one of the plurality of 5G NR frequency bands from data transceived within the remainder of the plurality of 5G NR frequency bands to establish a second network slice of the plurality of network slices;

the secure network slice orchestration system executing code for determining a first endpoint device of the plurality of endpoint computing devices assigned to a first of the plurality of security tiers is associated with the first network slice within the communications profile received from the CSM platform;

the secure network slice orchestration system determining a second endpoint device of the plurality of endpoint computing devices assigned to a second of the plurality of security tiers is associated with the second network slice within the communications profile received from the CSM platform; and the SDN controller of the RAN system establishing a first virtual WWAN access point transceiving data within the first network slice with the first of the plurality of endpoint computing devices and a second virtual WWAN access point transceiving data within the second network slice with the second endpoint computing device.

16. The information handling system of claim 15 further comprising:
the SDN controller establishing a plurality of additional network slices, each for transceiving data with endpoint computing devices assigned to different security tiers as indicated by instructions received from the CSM platform.

17. The information handling system of claim 16, wherein the first network slice transceives data in a separate 5G NR frequency band than the second network slice.

18. The information handling system of claim 15 further comprising:
the secure network slice orchestration system determining a second endpoint computing device of the plurality of endpoint computing devices assigned to the first of the plurality of security tiers is associated with the first network slice from the communications profiles received from the CSM platform; and
the SDN controller of the RAN system enabling the first virtual WWAN access point for transceiving data within the first network slice with the second of the plurality of endpoint computing devices.

19. The information handling system of claim 18, wherein the first endpoint computing device and the second endpoint computing device transceive data within the same 5G NR frequency band network slice.

20. The information handling system of claim 15 further comprising:
the WWAN interface device receiving an updated communications profile from the CSM platform indicating a shift of the first endpoint computing device to a different network slice based on a shift of monitored security measures to a different security tier;
the processor determining the first endpoint computing device is associated with a third network slice in the updated communications profile; and
the SDN controller of the RAN system reassigning the first endpoint computing device to a third virtual WWAN access point for transceiving data within the third network slice.

* * * * *